US010380936B2

(12) United States Patent
Nose et al.

(10) Patent No.: US 10,380,936 B2
(45) Date of Patent: *Aug. 13, 2019

(54) DISPLAY DEVICE, DISPLAY PANEL DRIVER, IMAGE PROCESSING APPARATUS AND IMAGE PROCESSING METHOD

(71) Applicant: Synaptics Japan GK, Tokyo (JP)

(72) Inventors: Takashi Nose, Tokyo (JP); Hirobumi Furihata, Tokyo (JP); Akio Sugiyama, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,565

(22) Filed: Feb. 1, 2018

(65) Prior Publication Data

US 2018/0158214 A1 Jun. 7, 2018

Related U.S. Application Data

(63) Continuation of application No. 14/617,764, filed on Feb. 9, 2015, now Pat. No. 9,886,779.

(30) Foreign Application Priority Data

Feb. 10, 2014 (JP) .................................. 2014023879

(51) Int. Cl.
*G09G 3/20* (2006.01)
*G06T 11/00* (2006.01)
(Continued)

(52) U.S. Cl.
CPC .......... *G09G 3/2092* (2013.01); *G06T 11/001* (2013.01); *G09G 5/04* (2013.01);
(Continued)

(58) Field of Classification Search
CPC ......... G06T 11/001; G06T 2207/10024; G06T 2207/20208; G09G 5/06; G09G 3/2092;
(Continued)

(56) References Cited

U.S. PATENT DOCUMENTS 7,973,973 B2 7/2011 Nose et al.
9,886,779 B2 * 2/2018 Nose ..................... G06T 11/001
(Continued)

FOREIGN PATENT DOCUMENTS

JP H06-339017 A 12/1994
JP 2003052050 A 2/2003

OTHER PUBLICATIONS

JP Office Action Application No. 2014-023879, dated Dec. 6, 2017 consists of 4 pages, English translation 4 pages.

*Primary Examiner* — Premal R Patel
(74) *Attorney, Agent, or Firm* — Patterson + Sheridan, LLP

(57) ABSTRACT

A display panel driver includes: a correction calculation section which performs correction calculations on input image data to generate saturation-enhanced output image data and a drive circuitry driving the display panel in response to the output image data and a starting point control section. The correction calculation section generates red (R) data, green (G) data and blue (B) data of the output image data by performing the correction calculations on R data, G data and B data of the input image data, respectively. The starting point control section controls the positions of starting points of the input-output curves of the correction calculations.

20 Claims, 18 Drawing Sheets

(51) Int. Cl.
*G09G 5/04* (2006.01)
*G09G 5/06* (2006.01)

(52) U.S. Cl.
CPC ......... *G09G 5/06* (2013.01); *G09G 2320/066* (2013.01); *G09G 2320/0673* (2013.01); *G09G 2340/06* (2013.01)

(58) Field of Classification Search
CPC ................. G09G 5/04; G09G 2340/06; G09G 2320/0673; G09G 2320/066; G09G 5/02; G09G 3/2003; G09G 2320/0271
See application file for complete search history.

(56) References Cited

U.S. PATENT DOCUMENTS

| | | |
|---|---|---|
| 2002/0036716 A1 | 3/2002 | Ito et al. |
| 2007/0268524 A1* | 11/2007 | Nose .................... G09G 3/2007 358/3.01 |
| 2007/0273776 A1 | 11/2007 | Lee |
| 2009/0245676 A1* | 10/2009 | Zhu ........................ H04N 9/646 382/254 |
| 2010/0079479 A1 | 4/2010 | Kurokawa et al. |

* cited by examiner

DISPLAY DEVICE, DISPLAY PANEL DRIVER, IMAGE PROCESSING APPARATUS AND IMAGE PROCESSING METHOD

CROSS-REFERENCE TO RELATED APPLICATIONS

This application is a continuation of co-pending U.S. application Ser. No. 14/617,674, filed Feb. 9, 2015, which claims priority to Japanese Patent Application No. 2014-023879, filed on Feb. 10, 2014. Each of the related applications is incorporated herein by reference.

TECHNICAL FIELD

The present invention relates to a display device, a display panel driver, an image processing apparatus and an image processing method, in particular, to process image data for saturation enhancement of display images in a display device, a display panel driver, an image processing apparatus.

BACKGROUND ART

The saturation enhancement processing is one of the known image processing techniques applied to image data. In a display device which originally has a relatively narrow color gamut, for example, performing saturation enhancement processing on image data effectively compensates the color gamut in images actually displayed on the display screen. More specifically, a liquid crystal display device which uses a white backlight undesirably has a narrow color gamut compared to recent OLED (organic light emitting diode) display devices, and therefore an enlargement of the color gamut is often required to achieve beautiful coloring. Saturation enhancement processing to image data allows enlarging the effective color gamut to meet such a requirement.

Saturation enhancement processing is also used to recover the saturation, when the saturation of an image is deteriorated by an auto contrast optimization (ACO). In a typical auto contrast optimization, a contrast enhancement is achieved in response to characterization data obtained by analyzing image data (for example, the luminance histogram or the average picture level (APL) of the image); note that a contrast enhancement is disclosed in Japanese patent No. 4,198,720 B, for example. In a typical auto contrast optimization, however, the saturation, that is, the differences among the grayscale levels of the red color (R), the green color (G) and the blue color (B) may be reduced, because a common contrast enhancement is performed for the red, green and blue colors, as is understood from FIG. 1A. To address this problem, saturation enhancement processing is often performed on image data obtained by a contrast enhancement.

According to a study of the inventors, however, there is a room for improvement in known saturation enhancement techniques to achieve appropriate saturation enhancement with a reduced circuit size.

Such a situation is especially severe when different image processing (such as contrast enhancement) is performed in series with saturation enhancement processing. FIG. 1B illustrates an example of a system in which saturation enhancement processing is performed after contrast enhancement processing. In order to achieve an improved contrast enhancement, output image data obtained by the contrast enhancement processing needs to have a wider bit width than that of input image data, to avoid gradation collapse in the contrast enhancement processing. When input image data to be subjected to contrast enhancement processing represent the grayscale level of each of the red, green and blue colors with eight bits, for example, the output image data of the contrast enhancement processing may be generated as image data which represent the grayscale level of each of the red, green and blue colors with 10 bits. When the output image data of the contrast enhancement processing are further subjected to saturation enhancement processing, the image data obtained by the saturation enhancement processing need to have a further wider bit width. When the output image data of the contrast enhancement processing represent the grayscale level of each of the red, green and blue colors with 10 bits, for example, the output image data of the saturation enhancement processing may be generated as image data which represent the grayscale level of each of the red, green and blue colors with 12 bits. The increase in the bit widths of the input and output image data of the saturation enhancement processing, however, undesirably increases the size of the circuit used for the saturation enhancement processing.

As a technique potentially related to the present invention, Japanese Patent Application Publication No. 2010-79119 A discloses a technique in which red-green-blue (RGB) data are transformed into hue-saturation-value (HSV) data and the saturation enhancement is achieved in the HSV color space. Japanese Patent Application Publication No. H06-339017 A discloses a saturation enhancement in which the red (R), green (G), blue (B) values of a saturation-enhanced image are respectively calculated by subtracting products of an enhancement coefficient and the differences between I and the original R, G, and B values from I, where I is the maximum value of the R, G, and B values of each pixel.

SUMMARY

Therefore, embodiments of the present invention provide an apparatus and method for image processing which achieve saturation enhancement with a reduce circuit size, and a display panel driver and display device using the same.

Other objectives and new features of the present invention would be understood from the disclosure in the Specification and attached drawings.

In an aspect of the present invention, a display device includes: a display panel and a display panel driver driving the display panel. The display panel driver includes: a correction calculation section which performs correction calculations on input image data to generate saturation-enhanced output image data; a drive circuitry driving the display panel in response to the output image data; and a starting point control section. The correction calculation section generates R data of the output image data by performing a first correction calculation on R data of the input image data, generates G data of the output image data by performing a second correction calculation on G data of the input image data, and generates B data of the output image data by performing a third correction calculation on B data of the input image data. The starting point control section controls a position of a starting point of a first input-output curve corresponding to an input-output relation of the first correction calculation; a position of a starting point of a second input-output curve corresponding to an input-output relation of the second correction calculation; and a position of a starting point of a third input-output curve corresponding to an input-output relation of the third correction calculation.

In another aspect of the present invention, a display panel driver for driving a display panel includes: a correction calculation section which performs correction calculations on input image data to generate saturation-enhanced output image data, a drive circuitry driving the display panel in response to the output image data and a starting point control section. The correction calculation section generates R data of the output image data by performing a first correction calculation on R data of the input image data, generates G data of the output image data by performing a second correction calculation on G data of the input image data, and generates B data of the output image data by performing a third correction calculation on B data of the input image data. The starting point control section controls a position of a starting point of a first input-output curve corresponding to an input-output relation of the first correction calculation; a position of a starting point of a second input-output curve corresponding to an input-output relation of the second correction calculation; and a position of a starting point of a third input-output curve corresponding to an input-output relation of the third correction calculation.

In still another aspect of the present invention, an image processing apparatus includes: a correction calculation section which performs correction calculations on input image data to generate saturation-enhanced output image data; and a starting point control section. The correction calculation section generates R data of the output image data by performing a first correction calculation on R data of the input image data, generates G data of the output image data by performing a second correction calculation on G data of the input image data, and generates B data of the output image data by performing a third correction calculation on B data of the input image data. The starting point control section controls a position of a starting point of a first input-output curve corresponding to an input-output relation of the first correction calculation; a position of a starting point of a second input-output curve corresponding to an input-output relation of the second correction calculation; and a position of a starting point of a third input-output curve corresponding to an input-output relation of the third correction calculation.

In still another aspect of the present invention, an image processing method includes: generating saturation-enhanced output image data by performing correction calculations on input image data. The step of generating the output image data includes: generating R data of the output image data by performing a first correction calculation on R data of the input image data; generating G data of the output image data by performing a second correction calculation on G data of the input image data; generating B data of the output image data by performing a third correction calculation on B data of the input image data; and controlling a position of a starting point of a first input-output curve corresponding to an input-output relation of the first correction calculation; a position of a starting point of a second input-output curve corresponding to an input-output relation of the second correction calculation; and a position of a starting point of a third input-output curve corresponding to an input-output relation of the third correction calculation.

The present invention provides an apparatus and method for image processing which achieve saturation enhancement with a reduce circuit size.

BRIEF DESCRIPTION OF THE DRAWINGS

The above and other advantages and features of the present invention will be more apparent from the following description taken in conjunction with the accompanied drawings, in which.

DESCRIPTION OF EMBODIMENTS

Figure 1A:
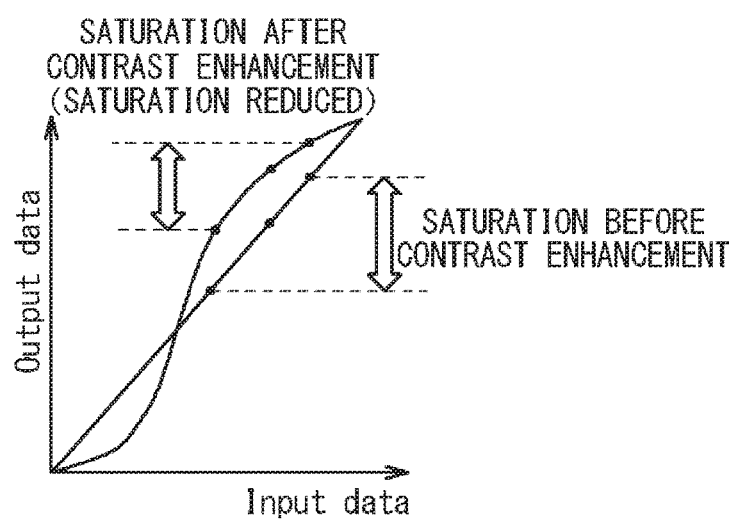
FIG. 1A illustrates a reduction in saturation caused by a contrast enhancement.

The invention will be now described herein with reference to illustrative embodiments. Those skilled in the art would recognize that many alternative embodiments can be accomplished using the teachings of the present invention and that the invention is not limited to the embodiments illustrated for explanatory purposed. It should be noted that same, similar or corresponding elements are denoted by the same or similar reference numerals in the following description.

Figure 2:
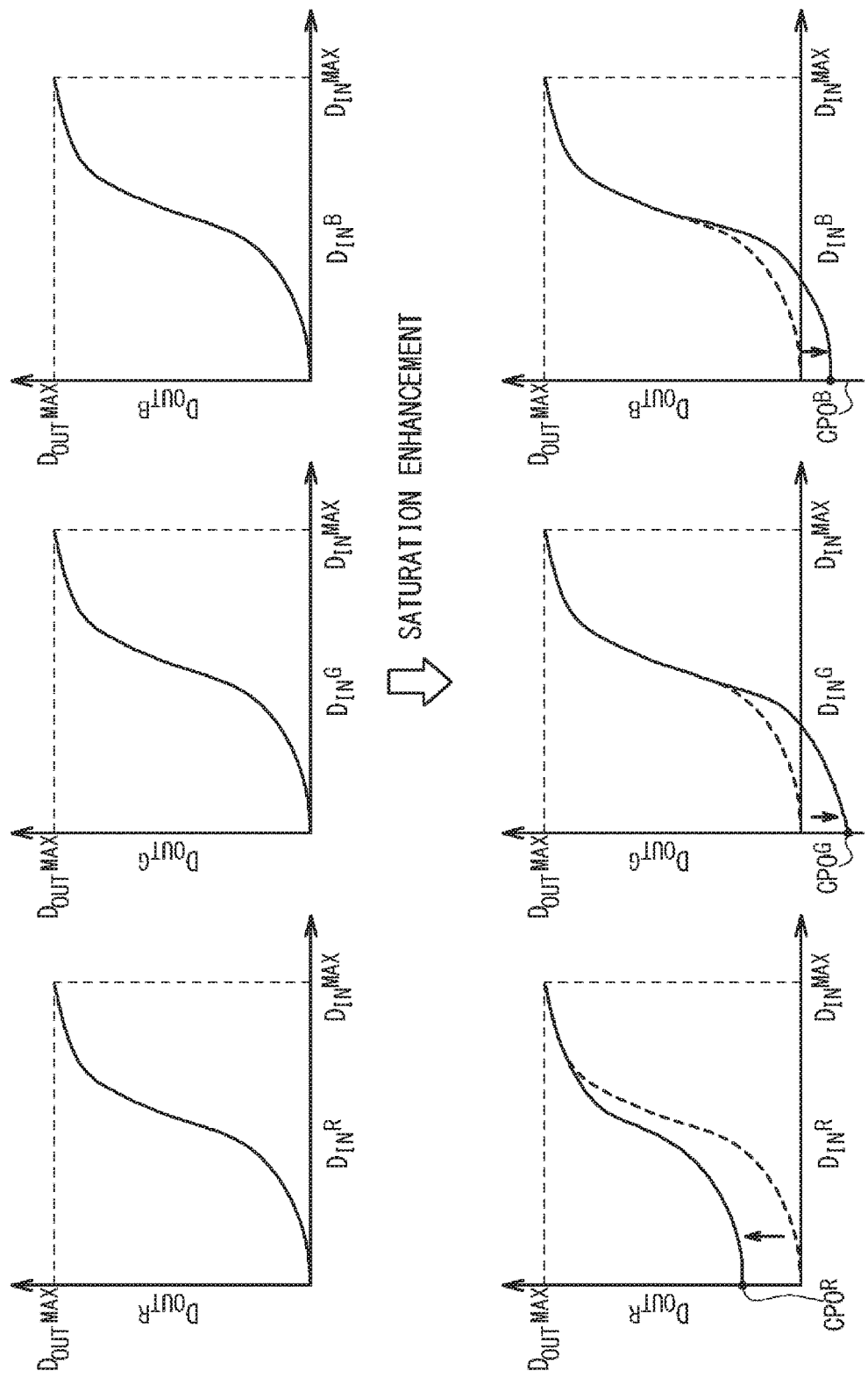
FIG. 2 is a conceptual diagram illustrating saturation enhancement processing in one embodiment of the present invention.

FIG. 2 is a conceptual diagram illustrating saturation enhancement processing in one embodiment of the present invention. In the saturation enhancement processing in the present embodiment, saturation-enhanced output image data $D_{OUT}$ are generated by performing correction calculations on input image data $D_{IN}$. Here, the input image data $D_{IN}$ include R data $D_{IN}^R$ (data indicating a grayscale level of the red color), G data $D_{IN}^G$ (data indicating a grayscale level of the green color) and B data $D_{IN}^B$ (data indicating a grayscale level of the blue color). Correspondingly, the output image data $D_{OUT}$ include R data $D_{OUT}^R$, G data $D_{OUT}^G$ and B data $D_{OUT}^B$.

In the present embodiment, a saturation enhancement is achieved by individually adjusting the position of the starting point of a curve indicating the input-output relation of the correction calculation (that is, the relation between the value of input image data and that of output image data) for each color. In the following, a curve indicating the input-output relation of a correction calculation may be referred to as "input-output curve". Note that a "starting point" means the point on an input-output curve for input image data with the allowed minimum value. The term "input-output curve" means to include the case when the input-output relation is linear, that is, the case when the input-output relation is represented with a straight line.

In detail, in the saturation enhancement processing in the present embodiment, R data $D_{OUT}^R$ of output image data $D_{OUT}$ are generated by performing a first correction calculation on R data $D_{IN}^R$ of input image data $D_{IN}$. Correspondingly, G data $D_{OUT}^G$ of the output image data $D_{OUT}$ are generated by performing a second correction calculation on G data $D_{IN}^G$ of the input image data $D_{IN}$, and B data $D_{OUT}^B$ of the output image data $D_{OUT}$ are generated by performing a third correction calculation on B data $D_{IN}^B$ of the input image data $D_{IN}$. In FIG. 2, the left graph illustrates the input-output curve of the first correction calculation, the center graph illustrates the input-output curve of the second correction calculation, and the right graph illustrates the input-output curve of the third correction calculation.

In the present embodiment, the saturation enhancement is achieved by controlling the position of the starting point $CP0^R$ of the input-output curve corresponding to the input-output relation of the first correction calculation, the position of the starting point $CP0^G$ of the input-output curve corresponding to the input-output relation of the second correction calculation, and the position of the starting point $CP0^B$ of the input-output curve corresponding to the input-output relation of the third correction calculation.

Such saturation enhancement processing allows enhancing the saturation with a simple calculation. This effectively reduces the size of the circuit used to perform the saturation enhancement processing. In addition, the saturation enhancement processing of the present embodiment is easy to be combined with other image processing techniques, such as contrast enhancement. For example, a saturation enhancement is achieved by adjusting the position of the starting point of the input-output curve, while a contrast enhancement is achieved by determining the overall shape of the input-output curve. This feature is also advantageous for reducing the size of the circuit used to perform the saturation enhancement processing.

In one embodiment, in saturation enhancement processing with respect to input image data $D_{IN}$ associated with a certain pixel, the position of the starting point $CP0^R$ of the input-output curve of the correction calculation performed on the R data $D_{IN}^R$ of the input image data $D_{IN}$ is determined in response to the difference $D_{IN}^R - Y_{PIXEL}$, where $Y_{PIXEL}$ is the luminance value of the certain pixel calculated from the input image data $D_{IN}$. Correspondingly, the position of the starting point $CP0^G$ of the input-output curve of the correction calculation performed on the G data $D_{IN}^G$ of the input image data $D_{IN}$ is determined in response to the difference $D_{IN}^G - Y_{PIXEL}$, and the position of the starting point $CP0^B$ of the input-output curve of the correction calculation performed on the B data $D_{IN}^B$ of the input image data $D_{IN}$ is determined in response to the difference $D_{IN}^B - Y_{PIXEL}$.

Since the luminance value $Y_{PIXEL}$ is a value determined as a weighted average of the R data $D_{IN}^R$, G data $D_{IN}^G$ and B data $D_{IN}^B$, at least one of the differences $D_{IN}^R - Y_{PIXEL}$, $D_{IN}^G - Y_{PIXEL}$ and $D_{IN}^B - Y_{PIXEL}$ is positive and at least another one is negative. Accordingly, the saturation can be enhanced by determining the positions of the starting points $CP0^R$, $CP0^G$ and $CP0^B$ on the basis of the differences $D_{IN}^R - Y_{PIXEL}$, $D_{IN}^G - Y_{PIXEL}$ and $D_{IN}^B - Y_{PIXEL}$. FIG. 2 illustrates saturation enhancement processing in the case when the difference $D_{IN}^R - Y_{PIXEL}$ is positive and the differences $D_{IN}^G - Y_{PIXEL}$ and $D_{IN}^B - Y_{PIXEL}$ are negative.

In one embodiment, in saturation enhancement processing for an image displayed in a certain frame period (or vertical synchronization period), the starting points $CP0^R$, $CP0^G$ and $CP0^B$ may be determined in response to the average saturation of the frame image displayed in the certain frame period. This effectively allows an improved saturation enhancement suitable for the average saturation of the frame image.

In one embodiment, the position of the starting point $CP0^R$ is determined on the basis of the product of the difference $D_{IN}^R - Y_{PIXEL}$ and an enhancement coefficient INST determined as described below, the position of the starting point $CP0^G$ is determined on the basis of the product of the difference $D_{IN}^G - Y_{PIXEL}$ and the enhancement coefficient INST, and the position of the starting point $CP0^B$ is determined on the basis of the product of the difference $D_{IN}^B - Y_{PIXEL}$ and the enhancement coefficient INST. The enhancement coefficient INST is determined as the minimum value of enhancement coefficients $INST^R$, $INST^G$ and $INST^B$, where the enhancement coefficients $INST^R$, $INST^G$ and $INST^B$ are obtained from the R data $D_{IN}^R$, G data $D_{IN}^G$, and B data $D_{IN}^B$ of the input image data $D_{IN}$, respectively. The enhancement coefficients $INST^R$, $INST^G$, and $INST^B$ are calculated with a predetermined function f(x) as follows:

$$INST^R = f(D_{IN}^R),$$

$$INST^G = f(D_{IN}^G), \text{ and}$$

$$INST^B = f(D_{IN}^B),$$

where f(x) is a function satisfying the following conditions:
(a) f(x) takes the maximum value when x is β;
(b) f(x) monotonically increases as x increases when x is less than β; and
(c) f(x) monotonically decreases as x increases when x is more than β.

β is determined as $D_{IN}^{MAX}/2$ or the integer closest to $D_{IN}^{MAX}/2$ (if there are two integers closest to $D_{IN}^{MAX}/2$, one selected from the two closest integers), where $D_{IN}^{MAX}$ is the allowed maximum value of the R data $D_{IN}^R$, G data $D_{IN}^G$, and B data $D_{IN}^B$. When the R data $D_{IN}^R$, G data $D_{IN}^G$, and B data $D_{IN}^B$ are eight bit data, for example, the allowed maximum value $D_{IN}^{MAX}$ is "255" and β is "127" or "128".

According to such saturation enhancement processing, the saturation is enhanced more strongly when the values of the R data $D_{IN}^R$, G data $D_{IN}^G$, and B data $D_{IN}^B$ (that is, the grayscale values of the red, green and blue colors) are about a half of the allowed maximum value $D_{IN}^{MAX}$ and this effectively achieves improved saturation enhancement.

Also in this case, the positions of the starting points $CP0^R$, $CP0^G$ and $CP0^B$ may be controlled in response to the average saturation $S_{AVE}$ in the frame image. More specifically, the position of the starting point $CP0^R$ is controlled in response to the product of the enhancement coefficient INST, the difference $D_{IN}^{MAX}-S_{AVE}$ and the difference $D_{IN}^R-Y_{PIXEL}$. Correspondingly, the position of the starting point $CP0^G$ may be controlled in response to the product of the enhancement coefficient INST, the difference $D_{IN}^{MAX}-S_{AVE}$ and the difference $D_{IN}^G-Y_{PIXEL}$, and the position of the starting point $CP0^B$ may be controlled in response to the product of the enhancement coefficient INST, the difference $D_{IN}^{MAX}-S_{AVE}$, and the difference $D_{IN}^B-Y_{PIXEL}$.

In the following, a description is given of more specific embodiments of the present invention.

First Embodiment

Figure 3:
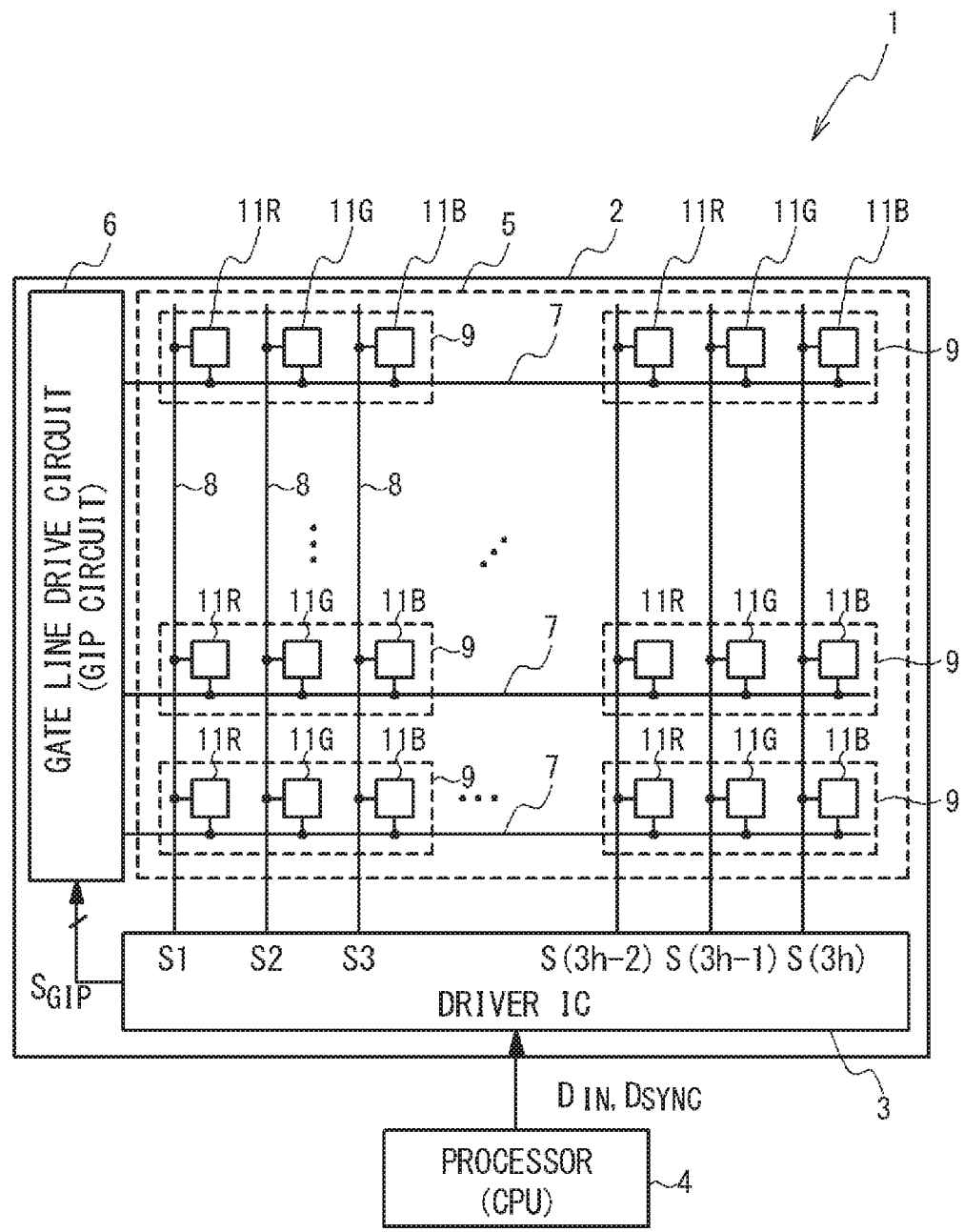
FIG. 3 is a block diagram illustrating an exemplary configuration of a display device in a first embodiment of the present invention.

FIG. 3 is a block diagram illustrating an exemplary configuration of a display device in a first embodiment of the present invention. The display device of the present embodiment, which is configured as a liquid crystal display device denoted by numeral 1, includes an LCD (liquid crystal display) panel 2 and a driver IC (integrated circuit) 3.

The LCD panel 2 includes a display region 5 and a gate line drive circuit 6 (also referred to as GIP (gate in panel) circuit). Disposed in the display region 5 are a plurality of gate lines 7 (also referred to as scan lines or address lines), a plurality of data lines 8 (also referred to as signal lines or source lines) and pixels 9. In the present embodiment, the number of the gate lines 7 is v and the number of the data lines 8 is 3h; the pixels 9 are arranged in v rows and h columns in the display region 5, where v and h are integers equal to or more than two. In the following, the horizontal direction of the display region 5 (that is, the direction in which the gate lines 7 are extended) may be referred to as X-axis direction and the vertical direction of the display region 5 (that is, the direction in which the data lines 8 are extended) may be referred to as Y-axis direction.

In the present embodiment, each pixel 9 includes three subpixels: an R subpixel 11R, a G subpixel 11G and a B subpixel 11B, where the R subpixel 11R is a subpixel corresponding to the red color (that is, a subpixel displaying the red color), the G subpixel 11G is a subpixel corresponding to the green color (that is, a subpixel displaying the green color) and the B subpixel 11B is a subpixel corresponding to the blue color (that is, a subpixel displaying the blue color). Note that the R subpixel 11R, G subpixel 11G and B subpixel 11B may be collectively referred to as subpixel 11 if not distinguished from each other. In the present embodiment, subpixels 11 are arrayed in v rows and 3h columns on the LCD panel 2. Each subpixel 11 is connected with one corresponding gate line 7 and one corresponding data line 8. In driving respective subpixels 11 of the LCD panel 2, gate lines 7 are sequentially selected and desired drive voltages are written into the subpixels 11 connected with a selected gate line 7 via the data lines 8. This allows setting the respective subpixels 11 to desired grayscale levels to thereby display a desired image in the display region 5 of the LCD panel 2.

Figure 4:
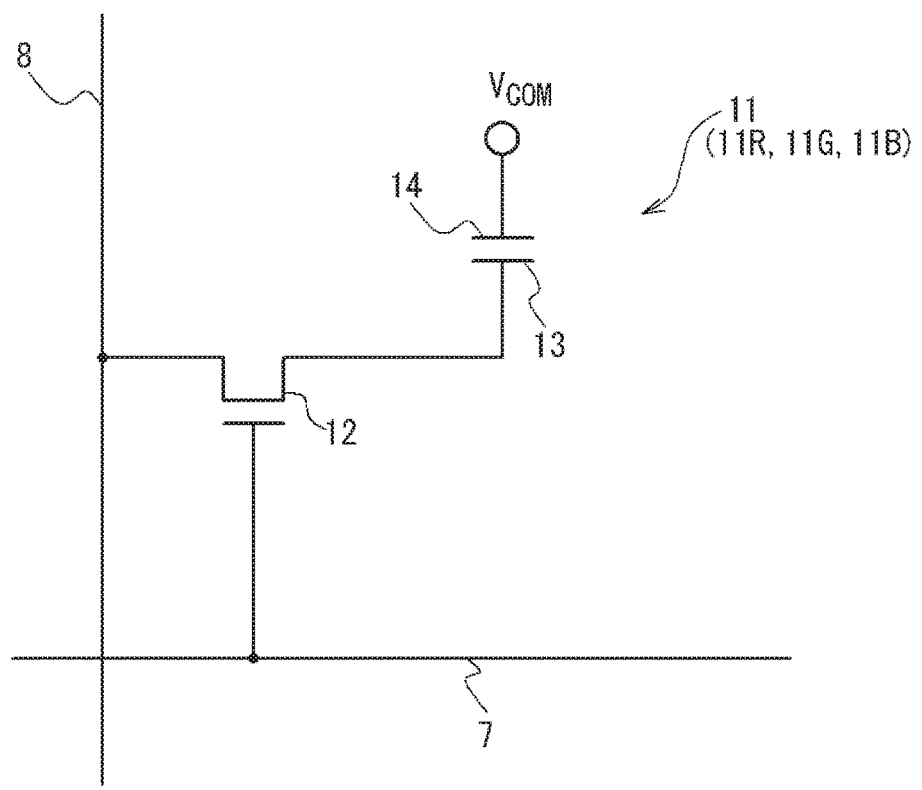
FIG. 4 is a circuit diagram schematically illustrating the configuration of each subpixel.

FIG. 4 is a circuit diagram schematically illustrating the configuration of each subpixel 11. Each subpixel 11 includes a TFT (thin film transistor) 12 and a pixel electrode 13. The TFT 12 has a gate connected with a gate line 7, a source connected with a data line 8 and a drain connected with the pixel electrode 13. The pixel electrode 13 is disposed opposed to the opposing electrode (common electrode) 14 of the LCD panel 2 and the space between each pixel electrode 13 and the opposing electrode 14 is filled with liquid crystal. Although FIG. 4 illustrates the subpixel 11 as if the opposing electrode 14 may be separately disposed for each subpixel 11, a person skilled in the art would appreciate that the opposing electrode 14 is actually shared by the subpixels 11 of the entire LCD panel 2.

Referring back to FIG. 3, the driver IC 3 drives the data lines 8 and also generates gate line control signals $S_{GIP}$ for controlling the gate line drive circuit 6. The drive of the data lines 8 is responsive to input image data $D_{IN}$ and synchronization data $D_{SYNC}$ received from a processor 4 (for example, a CPU (central processing unit)). It should be noted here that the input image data $D_{IN}$ are image data corresponding to images to be displayed in the display region 5 of the LCD panel 2, more specifically, data indicating the grayscale levels of each subpixel 11 of each pixel 9. In the present embodiment, the input image data $D_{IN}$ represent the grayscale level of each subpixel 11 of each pixel 9 with eight bits. In other words, the input image data $D_{IN}$ represent the grayscale levels of each pixel 9 of the LCD panel 2 with 24 bits. The synchronization data $D_{SYNC}$ are used to control the operation timing of the driver IC 3; the generation timing of various timing control signals in the driver IC 3, including the vertical synchronization signal $V_{SYNC}$ and the horizontal synchronization signal $H_{SYNC}$, is controlled in response to the synchronization data $D_{SYNC}$. Also, the gate line control signals $S_{GIP}$ are generated in response to the synchronization data $D_{SYNC}$. The driver IC 3 is mounted on the LCD panel 2 with a surface mounting technology such as a COG (chip on glass) technology.

Figure 5:
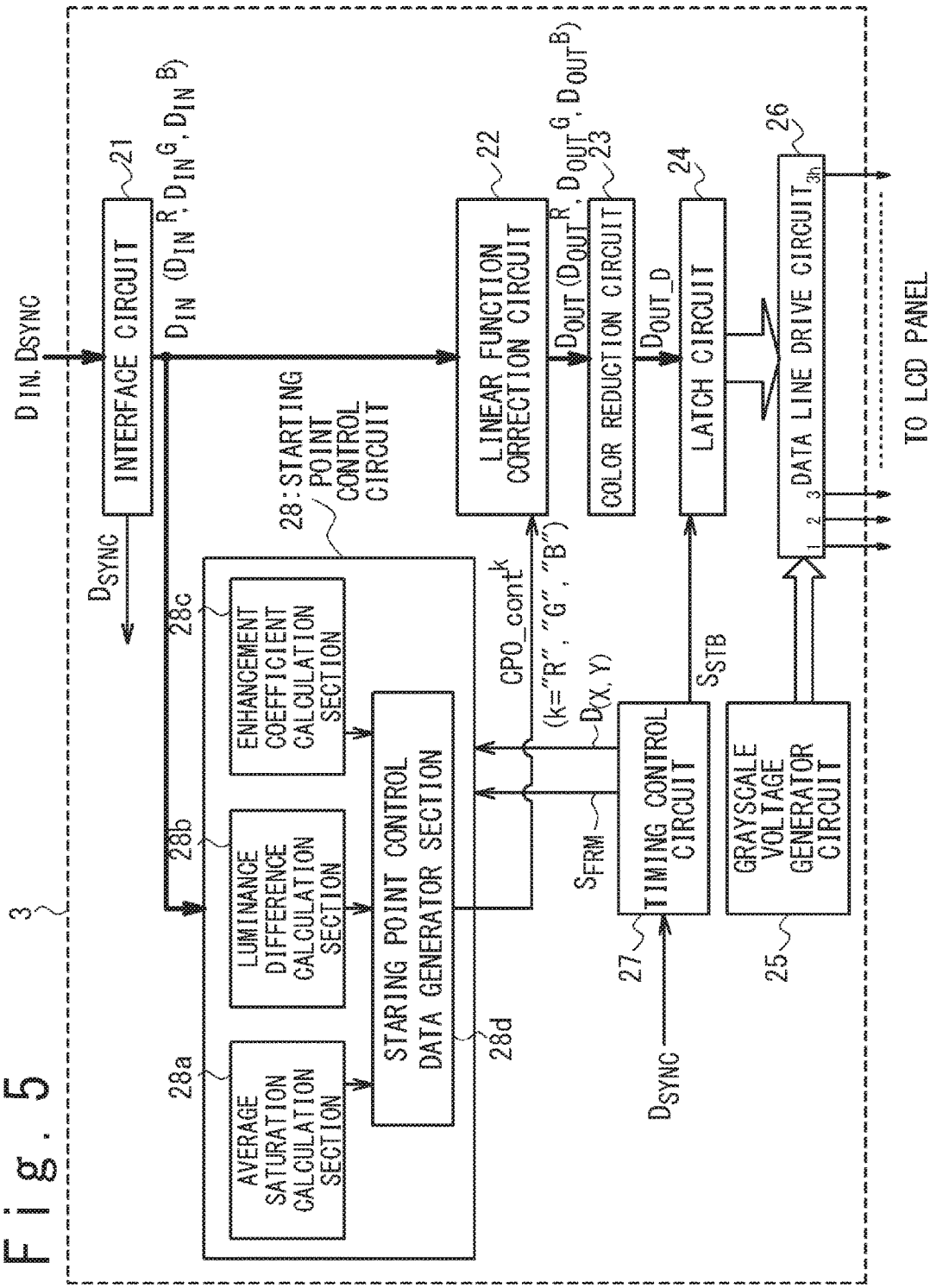
FIG. 5 is a block diagram illustrating an exemplary configuration of a driver IC in the first embodiment.

FIG. 5 is a block diagram illustrating an example of the configuration of the driver IC 3. The driver IC 3 includes an interface circuit 21, a linear function correction circuit 22, a color reduction circuit 23, a latch circuit 24, a grayscale voltage generator circuit 25, a data line drive circuit 26, a timing control circuit 27, and a starting point control circuit 28.

The interface circuit 21 receives the input image data $D_{IN}$ and synchronization data $D_{SYNC}$ from the processor 4 and forwards the input image data $D_{IN}$ to the linear function correction circuit 22 and the synchronization data $D_{SYNC}$ to the timing control circuit 27.

The linear function correction circuit 22 performs saturation enhancement processing as described above; the linear function correction circuit 22 generates output image data $D_{OUT}$ by performing saturation enhancement processing on the input image data $D_{IN}$.

In the following, data indicating the grayscale level of an R subpixel 11R of input image data $D_{IN}$ may be referred to as input image data $D_{IN}^R$. Correspondingly, data indicating the grayscale level of a G subpixel 11G of input image data $D_{IN}$ may be referred to as input image data $D_{IN}^G$, and data indicating the grayscale level of a B subpixel 11B of input image data $D_{IN}$ may be referred to as input image data $D_{IN}^B$. Similarly, data indicating the grayscale level of an R subpixel 11R of the output image data $D_{OUT}$ may be referred to as output image data $D_{OUT}^R$. Correspondingly, data indicating the grayscale level of a G subpixel 11G of the output image data $D_{OUT}$ may be referred to as output image data $D_{OUT}{}^G$, and data indicating the grayscale level of a B subpixel 11B of the output image data $D_{OUT}$ may be referred to as output image data $D_{OUT}{}^B$.

In the present embodiment, straight lines are used as the input-output curves of the saturation enhancement processing performed in the linear function correction circuit 22 (that is, the curves indicating the input-output relation between the input image data $D_{IN}$ inputted to the linear function correction circuit 22 and the output image data $D_{OUT}$ outputted from the linear function correction circuit 22), and the positions of the starting points of the input-output curves are specified by starting point control data CP0_cont$^R$, CP0_cont$^G$ and CP0_cont$^B$ received from the starting point control circuit 28. Here, the starting point control data CP0_cont$^R$ specifies the position of the starting point of the input-output curve of the processing to be performed on the R data $D_{IN}{}^R$ of the input image data $D_{IN}$. Correspondingly, the starting point control data CP0_cont$^G$ specifies the position of the starting point of the input-output curve of the processing to be performed on the G data $D_{IN}{}^G$ of the input image data $D_{IN}$ and the starting point control data CP0_cont$^B$ specifies the position of the starting point of the input-output curve of the processing to be performed on the B data $D_{IN}{}^B$ of the input image data $D_{IN}$.

The number of bits of the R data $D_{OUT}{}^R$, G data $D_{OUT}{}^G$ and B data $D_{OUT}{}^B$ of the output image data $D_{OUT}$ is larger than that of the R data $D_{IN}{}^R$, G data $D_{IN}{}^G$ and B data $D_{IN}{}^B$ of the input image data $D_{IN}$. This effectively avoids losing information of the grayscale levels of pixels in the correction calculation. In the present embodiment, in which the R data $D_{IN}{}^R$, G data $D_{IN}{}^G$, and B data $D_{IN}{}^B$ of the input image data $D_{IN}$ are generated as 8-bit data, the R data $D_{OUT}{}^R$, G data $D_{OUT}{}^G$ and B data $D_{OUT}{}^B$ of the output image data $D_{OUT}$ may be, for example, generated as 10-bit data.

The color reduction circuit 23, the latch circuit 24, the grayscale voltage generator circuit 25 and the data line drive circuit 26 function in total as a drive circuitry which drives the data lines 8 of the display region 5 of the LCD panel 2 in response to the output image data $D_{OUT}$ generated by the linear function correction circuit 22. Specifically, the color reduction circuit 23 performs a color reduction on the output image data $D_{OUT}$ generated by the linear function correction circuit 22 to generate color-reduced image data $D_{OUT\_D}$. The latch circuit 24 latches the color-reduced image data $D_{OUT\_D}$ from the color reduction circuit 23 in response to a latch signal $S_{STB}$ received from the timing control circuit 27 and forwards the color-reduced image data $D_{OUT\_D}$ to the data line drive circuit 26. The grayscale voltage generator circuit 25 feeds a set of grayscale voltages to the data line drive circuit 26. In one embodiment, the number of the grayscale voltages fed from the grayscale voltage generator circuit 25 may be 256 ($=2^8$) in view of the configuration in which the grayscale level of each subpixel 11 of each pixel 9 is represented with eight bits. The data line drive circuit 26 drives the data lines 8 of the display region 5 of the LCD panel 2 in response to the color-reduced image data $D_{OUT\_D}$ received from the latch circuit 24. In detail, the data line drive circuit 26 selects desired grayscale voltages from the set of the grayscale voltages received from the grayscale voltage generator circuit 25 in response to color-reduced image data $D_{OUT\_D}$, and drives the corresponding data lines 8 of the LCD panel 2 to the selected grayscale voltages.

The timing control circuit 27 performs timing control of the entire drive IC 3 in response to the synchronization data $D_{SYNC}$. In detail, the timing control circuit 27 generates the latch signal $S_{STB}$ in response to the synchronization data $D_{SYNC}$ and feeds the generated latch signal $S_{STB}$ to the latch circuit 24. The latch signal $S_{STB}$ is a control signal instructing the latch circuit 24 to latch the color-reduced data $D_{OUT\_D}$. Furthermore, the timing control circuit 27 generates a frame signal $S_{FRM}$ in response to the synchronization data $D_{SYNC}$ and feeds the generated frame signal $S_{FRM}$ to the starting point control circuit 28. It should be noted here that the frame signal $S_{FRM}$ is a control signal which informs the starting point control circuit 28 of the start of each frame period; the frame signal $S_{FRM}$ is asserted at the beginning of each frame period. The vertical synchronization signal $V_{SYNC}$ generated in response to the synchronization data $D_{SYNC}$ may be used as the frame signal $S_{FRM}$. The timing control circuit 27 also generates coordinate data $D_{(X, Y)}$ indicating the coordinates of the pixel 9 for which the input image data $D_{IN}$ currently indicate the grayscale levels of the respective subpixels 11 thereof and feeds the generated coordinate data $D_{(X, Y)}$ to the starting point control circuit 28. When input image data $D_{IN}$ which describe the grayscale levels of the respective subpixels 11 of a certain pixel 9 are fed to the starting point control circuit 28, the timing control circuit 27 feeds the coordinate data $D_{(X, Y)}$ indicating the coordinates of the certain pixel 9 in the display region 5 to the starting point control circuit 28.

The starting point control circuit 28 controls the saturation enhancement processing performed in the linear function correction circuit 22. The starting point control circuit 28 generates the above-described starting point control data CP0_cont$^R$, CP0_cont$^G$ and CP0_cont$^B$ in response to the input image data $D_{IN}$, to thereby control the position of the starting point of the input-output curve of the processing performed on the input image data $D_{IN}$ for each color. More specifically, the starting point control circuit 28 includes an average saturation calculation section 28a, a luminance difference calculation section 28b, an enhancement coefficient calculation section 28c, and a starting point control data generator section 28d.

The average saturation calculation section 28a calculates the average saturation $S_{AVE}$ of each frame image (that is, the image displayed in the display region 5 of the LCD panel 2 in each frame period), from the input image data $D_{IN}$.

The luminance difference calculation section 28b calculates, for each pixel 9, the difference Rdist between the R data $D_{IN}{}^R$ and the luminance value $Y_{PIXEL}$, the difference Gdist between the G data $D_{IN}{}^G$ and the luminance value $Y_{PIXEL}$, and the difference Bdist between the B data $D_{IN}{}^B$ and the luminance value $Y_{PIXEL}$, from the input image data $D_{IN}$ associated with each pixel 9.

The enhancement coefficient calculation section 28c calculates an enhancement coefficient INST from the R data $D_{IN}{}^R$, G data $D_{IN}{}^G$, and B data $D_{IN}{}^B$ of the input image data $D_{IN}$ for each pixel 9. As described later, the enhancement coefficient INST is a coefficient indicating the degree of the saturation enhancement in the saturation enhancement processing.

The starting point control data generator section 28d generates the starting point control data CP0_cont$^R$, CP0_cont$^G$, and CP0_cont$^B$ in response to the average saturation $S_{AVE}$ calculated by the average saturation calculation section 28a, the differences Rdist, Gdist, and Bdist calculated by the luminance difference calculation section 28b and the enhancement coefficient INST calculated by the enhancement coefficient calculation section 28c. In the saturation enhancement processing of input image data $D_{IN}$ associated with a certain pixel 9 with respect to a certain frame period, the starting point control data CP0_cont$^R$, CP0_cont$^G$, and CP0_cont$^B$ used for the saturation enhancement processing for the certain pixel 9 are calculated on the basis of the average saturation $S_{AVE}$ of the frame image displayed in the certain frame period, the differences Rdist, Gdist, and Bdist and the enhancement coefficient INST calculated from the R data $D_{IN}{}^R$, G data $D_{IN}{}^G$, and B data $D_{IN}{}^B$ of the input image data $D_{IN}$ associated with the certain pixel 9.

Figure 6:
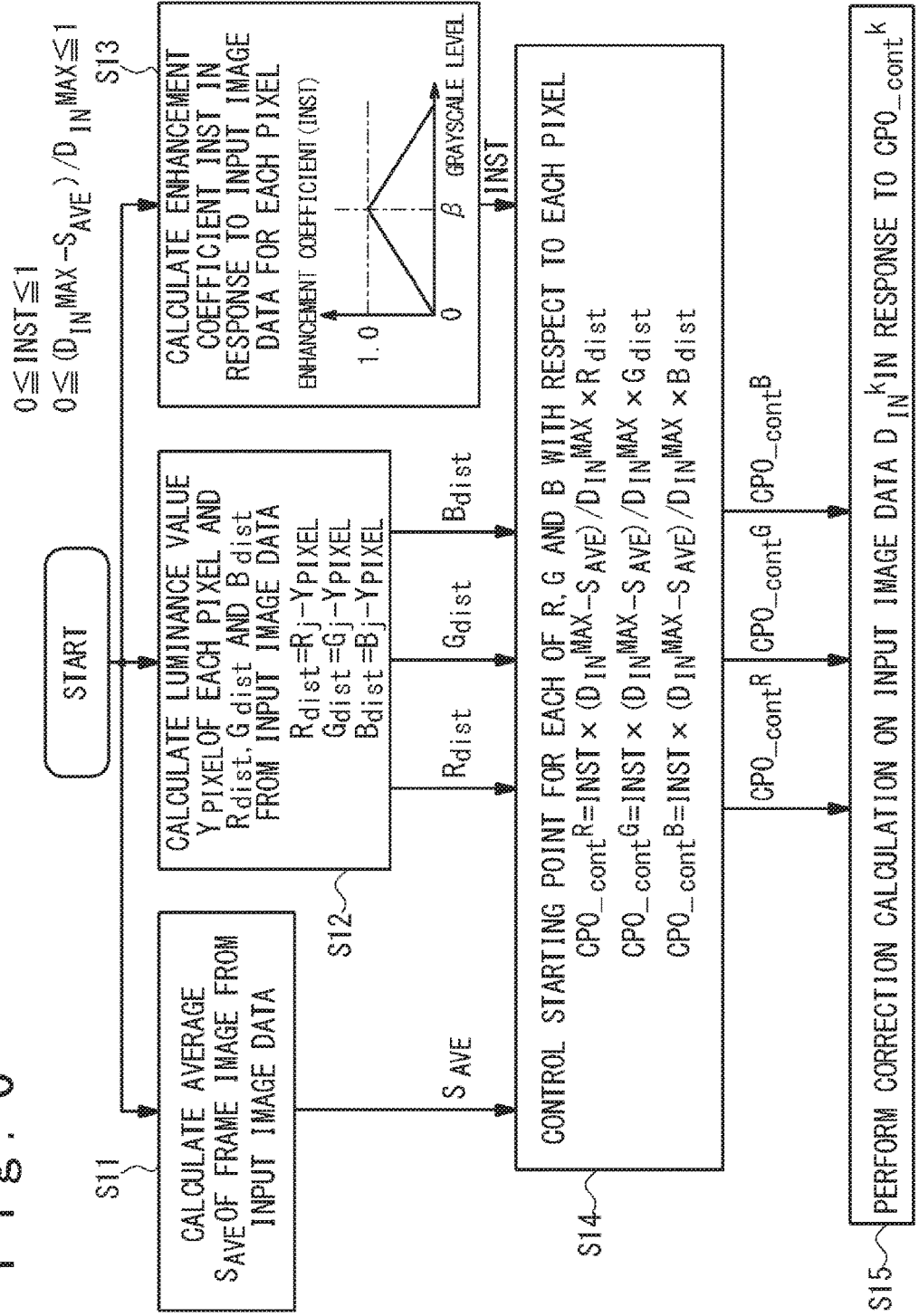
FIG. 6 is a flowchart illustrating an exemplary procedure of the saturation enhancement processing of the first embodiment.

FIG. 6 is a flowchart illustrating the saturation enhancement processing in the present embodiment, more specifically, the processing performed in the starting point control circuit 28 and the linear function correction circuit 22. Overall, the saturation enhancement processing in the present embodiment includes calculation of starting point control data $CP0\_cont^R$, $CP0\_cont^G$, and $CP0\_cont^B$ (steps S11 to S14) and processing on the input image data $D_{IN}$ on the basis of the starting point control data $CP0\_cont^R$, $CP0\_cont^G$, and $CP0\_cont^B$ (step S15).

The following processing is performed in the calculation of the starting point control data $CP0\_cont^R$, $CP0\_cont^G$, and $CP0\_cont^B$.

At step S11, the average saturation $S_{AVE}$ of the frame image displayed in each frame period is calculated from the input image data $D_{IN}$. The saturation S of a certain pixel 9 is calculated as the difference between the maximum value and minimum value of the R data $D_{IN}{}^R$, G data $D_{IN}{}^G$, and B data $D_{IN}{}^B$ of the input image data $D_{IN}$ associated with the certain pixel 9. The average saturation $S_{AVE}$ of a certain frame image is calculated as the average of the saturations of all the pixels 9 in the frame image. More specifically, the average saturation $S_{AVE}$ of a certain frame image is calculated in accordance with the following expressions (1a) and (1b):

$$S_j = \max(R_j, G_j, B_j) - \min(R_j, G_j, B_j) \quad (1a)$$

$$S_{AVE} = \frac{\sum_j S_j}{Data\_count} \quad (1b)$$

where $R_j$, $G_j$, and $B_j$ are the values of the R data $D_{IN}{}^R$, G data $D_{IN}{}^G$, and B data $D_{IN}{}^B$ associated with pixel j of the frame image and $S_j$ is the saturation of pixel j. In the above, $\max(R_j, G_j, B_j)$ is the maximum value of $R_j$, $G_j$, and $B_j$ and $\min(R_j, G_j, B_j)$ is the minimum value of $R_j$, $G_j$, and $B_j$. Data_count is the number of the pixels 9 in the display region 5 (the number of the pixels 9 in the frame image) and $\Sigma$ represents the sum with respect to all the pixels 9 in the display region 5. As described above, the average saturation $S_{AVE}$ is calculated by the average saturation calculation section 28a. It is only necessary to calculate the average saturation $S_{AVE}$ once for each frame period.

The luminance value $Y_{PIXEL}$ of each pixel 9 is further calculated from the input image data $D_{IN}$ and the difference Rdist between the R data $D_{IN}{}^R$ and the luminance value $Y_{PIXEL}$, the difference Gdist between the G data $D_{IN}{}^G$ and the luminance value $Y_{PIXEL}$ and the difference Bdist between the B data $D_{IN}{}^B$ and the luminance value $Y_{PIXEL}$ are calculated from the input image data $D_{IN}$ associated with each pixel 9. The luminance value $Y_{PIXEL}$ and the differences Rdist, Gdist, and Bdist are calculated by the luminance difference calculation section 28b.

In detail, the luminance value $Y_{PIXEL}$ of each pixel j is calculated as a weighted average of the values $R_j$, $G_j$, and $B_j$ of the R data $D_{IN}{}^R$, G data $D_{IN}{}^G$, and B data $D_{IN}{}^B$ of the input image data $D_{IN}$ in accordance with the following expression (2a):

$$Y_{PIXEL} = aR_j + bG_j + cB_j, \quad (2a)$$

where a, b, and c are weights given to the R data $D_{IN}{}^R$, G data $D_{IN}{}^G$, and B data $D_{IN}{}^B$, respectively. The weights a, b, and c are larger than zero and satisfy the following expression (2b):

$$a+b+c=1 \quad (2b)$$

The weights a, b, and c used for the calculation of the luminance value $Y_{PIXEL}$ depend on the definition of the luminance value $Y_{PIXEL}$.

According to ITU-R BT.709, for example, the luminance value Y is given by the following expression:

$$Y_{PIXEL} = 0.2126 \cdot R_j + 0.7152 \cdot G_j + 0.0722 \cdot B_j. \quad (2c)$$

This expression implies that the weights a, b and c are defined as follows:
a=0.2126,
b=0.7152, and
c=0.0722.

The difference Rdist between the R data $D_{IN}{}^R$ and the luminance value $Y_{PIXEL}$, the difference Gdist between the G data $D_{IN}{}^G$ and the luminance value $Y_{PIXEL}$, and the difference Bdist between the B data $D_{IN}{}^B$ and the luminance value $Y_{PIXEL}$ are calculated in accordance with the following expressions (3a) to (3c):

$$Rdist = R_j - Y_{PIXEL} \quad (3a)$$

$$Gdist = G_j - Y_{PIXEL}, \text{ and} \quad (3b)$$

$$Bdist = B_j - Y_{PIXEL}. \quad (3c)$$

At step S13, an enhancement coefficient INST associated with each pixel 9 is further calculated from the input image data $D_{IN}$ associated with each pixel 9. The calculation of the enhancement coefficient INST is achieved by the enhancement coefficient calculation section 28c as described above. The enhancement coefficient INST is calculated for each pixel 9 as described below: First, enhancement coefficients $INST^R$, $INST^G$, and $INST^B$ are respectively calculated for R data $D_{IN}{}^R$, G data $D_{IN}{}^G$, and B data $D_{IN}{}^B$ of the input image data $D_{IN}$ associated with each pixel 9.

The enhancement coefficients $INST^R$, $INST^G$, and $INST^B$ are calculated with a function f(x) as follows:

$$INST^R = f(D_{IN}{}^R), \quad (4a)$$

$$INST^G = f(D_{IN}{}^G), \text{ and} \quad (4b)$$

$$INST^B = f(D_{IN}{}^B), \quad (4c)$$

where f(x) is a function satisfying the following conditions (a) to (c):
(a) f(x) takes the maximum value when x is $\beta$;
(b) f(x) monotonically increases as x increases when x is less than $\beta$; and
(c) f(x) monotonically decreases as x increases when x is more than $\beta$.

$\beta$ may be determined as $D_{IN}{}^{MAX}/2$ or the integer closest to $D_{IN}{}^{MAX}/2$ (if there are two integers closest to $D_{IN}{}^{MAX}/2$, one selected from the two integers), where $D_{IN}{}^{MAX}$ is the allowed maximum value of the R data $D_{IN}{}^R$, G data $D_{IN}{}^G$, and B data $D_{IN}{}^B$. In the present embodiment in which the R data $D_{IN}{}^R$, G data $D_{IN}{}^G$, and B data $D_{IN}{}^B$ are eight bit data, for example, the allowed maximum value $D_{IN}{}^{MAX}$ is "255" and $\beta$ is "127" or "128".

Note that expressions (4a) to (4b) can be rewritten as the following expressions (5a) to (5c):

$$INST^R = f(R_j), \quad (5a)$$

$$INST^G = f(G_j), \text{ and} \tag{5b}$$

$$INST^B = f(B_j), \tag{5c}$$

where $R_j$, $G_j$, and $B_j$ are the values of the R data $D_{IN}{}^R$, G data $D_{IN}{}^G$, and B data $D_{IN}{}^B$ of the input image data $D_{IN}$ associated with pixel j.

Figure 7:
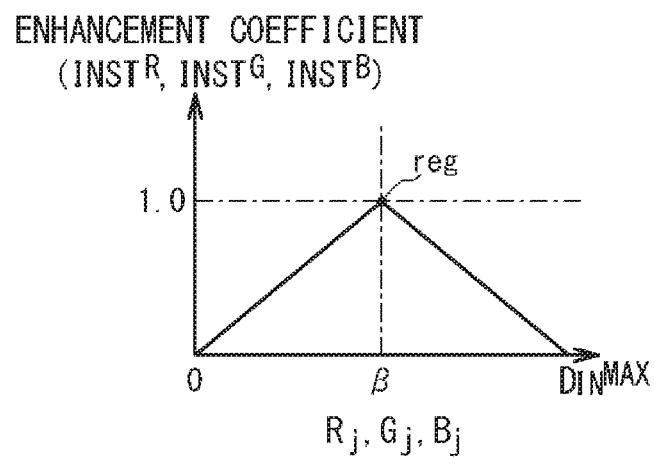
FIG. 7 is a graph illustrating an example of a function used to determine an enhancement coefficient in the first embodiment.

FIG. 7 is a graph illustrating a specific example of a function used to determine the enhancement coefficients $INST^R$, $INST^G$, and $INST^B$. In one embodiment, the enhancement coefficients $INST^R$, $INST^G$, and $INST^B$ associated with pixel j may be calculated from the values $R_j$, $G_j$, and $B_j$ of the R data $D_{IN}{}^R$, G data $D_{IN}{}^G$, and B data $D_{IN}{}^B$ of the input image data $D_{IN}$ associated with pixel j in accordance with the following expressions (6a) to (6c):

$$INST^R = \begin{cases} \dfrac{reg}{\beta} \cdot \dfrac{R_j}{\beta} & \text{if } R_j \leq \beta \\ \dfrac{reg}{\beta} \cdot \dfrac{D_{IN}^{MAX} - R_j}{\beta} & \text{if } R_j > \beta \end{cases} \tag{6a}$$

$$INST^G = \begin{cases} \dfrac{reg}{\beta} \cdot \dfrac{G_j}{\beta} & \text{if } G_j \leq \beta \\ \dfrac{reg}{\beta} \cdot \dfrac{D_{IN}^{MAX} - G_j}{\beta} & \text{if } G_j > \beta \end{cases} \tag{6b}$$

$$INST^B = \begin{cases} \dfrac{reg}{\beta} \cdot \dfrac{B_j}{\beta} & \text{if } B_j \leq \beta \\ \dfrac{reg}{\beta} \cdot \dfrac{D_{IN}^{MAX} - B_j}{\beta} & \text{if } B_j > \beta \end{cases} \tag{6c}$$

where reg is a register value set in an enhancement coefficient setting register (not shown) integrated within the driver IC 3; reg takes a value larger than zero and equal to or less than β. The degree of the saturation enhancement can be adjusted by adjusting the register value reg.

In particular, when the register value reg is equal to β, expressions (6a) to (6c) can be rewritten as the following expressions (7a) to (7c):

$$INST^R = \begin{cases} \dfrac{R_j}{\beta} & \text{if } R_j \leq \beta \\ \dfrac{D_{IN}^{MAX} - R_j}{\beta} & \text{if } R_j > \beta \end{cases} \tag{7a}$$

$$INST^G = \begin{cases} \dfrac{G_j}{\beta} & \text{if } G_j \leq \beta \\ \dfrac{D_{IN}^{MAX} - G_j}{\beta} & \text{if } G_j > \beta \end{cases} \tag{7b}$$

$$INST^B = \begin{cases} \dfrac{B_j}{\beta} & \text{if } B_j \leq \beta \\ \dfrac{D_{IN}^{MAX} - B_j}{\beta} & \text{if } B_j > \beta \end{cases} \tag{7c}$$

FIG. 7 is a graph illustrating the enhancement coefficients $INST^R$, $INST^G$, and $INST^B$ calculated in accordance with expressions (7a) to (7c).

The enhancement coefficient INST finally calculated for each pixel 9 is determined as the minimum value of enhancement coefficients $INST^R$, $INST^G$, and $INST^B$, which are obtained for the R data $D_{IN}{}^R$, G data $D_{IN}{}^G$, and B data $D_{IN}{}^B$, respectively. In other words, it holds:

$$INST = \min(INST^R, INST^G, INST^B). \tag{8}$$

Referring back to FIG. 6, at step S14, Starting point control data CP0_cont$^R$, CP0_cont$^G$, and CP0_cont$^B$ are calculated on the basis of the average saturation $S_{AVE}$, differences Rdist, Gdist, and Bdist and enhancement coefficient INST, which are calculated as described above. The calculation of the starting point control data CP0_cont$^R$, CP0_cont$^G$, and CP0_cont$^B$ are achieved by the starting point control data generator section 28*d*.

The starting point control data CP0_cont$^R$ is determined so that the starting point control data CP0_cont$^R$ increases as the difference $D_{IN}{}^{MAX} - S_{AVE}$ increases and is proportional to the difference Rdist, where the difference $D_{IN}{}^{MAX} - S_{AVE}$ is obtained by subtracting the average saturation $S_{AVE}$ from the allowed maximum value $D_{IN}{}^{MAX}$. Correspondingly, the starting point control data CP0_cont$^G$ is determined so that the starting point control data CP0_cont$^G$ increases as the difference $D_{IN}{}^{MAX} - S_{AVE}$ increases and is proportional to the difference Gdist, and the starting point control data CP0_cont$^B$ is determined so that the starting point control data CP0_cont$^B$ increases as the difference $D_{IN}{}^{MAX} - S_{AVE}$ increases and is proportional to the difference Bdist. The enhancement coefficient INST is used as a parameter indicating the degree of the saturation enhancement, commonly for the calculations of the starting point control data CP0_cont$^R$, CP0_cont$^G$, and CP0_cont$^B$.

In one embodiment, the starting point control data CP0_cont$^R$, CP0_cont$^G$, and CP0_cont$^B$ may be calculated in accordance with the following expressions (9a) to (9c):

$$CP0\_cont^R = INST \cdot \dfrac{D_{IN}^{MAX} - S_{AVE}}{D_{IN}^{MAX}} \cdot Rdist \tag{9a}$$

$$CP0\_cont^G = INST \cdot \dfrac{D_{IN}^{MAX} - S_{AVE}}{D_{IN}^{MAX}} \cdot Gdist \tag{9b}$$

$$CP0\_const^B = INST \cdot \dfrac{D_{IN}^{MAX} - S_{AVE}}{D_{IN}^{MAX}} \cdot Bdist \tag{9c}$$

At step S15, the input image data $D_{IN}$ are processed in response to the starting point control data CP0_cont$^R$, CP0_cont$^G$, and CP0_cont$^B$, to thereby calculate output image data $D_{OUT}$. The output image data $D_{OUT}$ are obtained as a result of the saturation enhancement processing to the input image data $D_{IN}$.

In the processing at step S15, the input-output curves of the processing applied to the R data $D_{IN}{}^R$, G data $D_{IN}{}^G$, and B data $D_{IN}{}^B$ of the input image data $D_{IN}$ are each defined as a straight line. The starting point of the input-output curves of the processing applied to the R data $D_{IN}{}^R$ of the input image data $D_{IN}$ is specified by the starting point control data CP0_cont$^R$. Correspondingly, the starting point of the input-output curves of the processing applied to the G data $D_{IN}{}^G$ of the input image data $D_{IN}$ is specified by the starting point control data CP0_cont$^G$ and the starting point of the input-output curves of the processing applied to the B data $D_{IN}{}^B$ of the input image data $D_{IN}$ is specified by the starting point control data CP0_cont$^B$. Note that the end point of the input-output curve of the processing to the input image data $D_{IN}$ (the point on the input-output curve corresponding to input image data $D_{IN}$ with the allowed maximum value $D_{IN}{}^{MAX}$) is determined commonly for the R data $D_{IN}{}^R$, G data $D_{IN}{}^G$, and B data $D_{IN}{}^B$, so that the value of the output image data $D_{OUT}$ is determined as the allowed maximum value $D_{OUT}{}^{MAX}$ when the value of the input image data $D_{IN}$ is the allowed maximum value $D_{IN}{}^{MAX}$. Note that allowed maximum value $D_{OUT}^{MAX}$ depends on the bit width of the R data $D_{OUT}^{R}$, G data $D_{OUT}^{G}$, and B data $D_{OUT}^{B}$ of the output image data $D_{OUT}$.

More specifically, the values of the R data $D_{OUT}^{R}$, G data $D_{OUT}^{G}$, and B data $D_{OUT}^{B}$ of the output image data $D_{OUT}$ are calculated in accordance with the following expressions (10a) to (104

$$D_{OUT}^{R} = \frac{D_{OUT}^{MAX} - \text{CP0\_cont}^{R}}{D_{IN}^{MAX}} \cdot D_{IN}^{R} + \text{CP0\_cont}^{R} \quad (10a)$$

$$D_{OUT}^{G} = \frac{D_{OUT}^{MAX} - \text{CP0\_cont}^{G}}{D_{IN}^{MAX}} \cdot D_{IN}^{G} + \text{CP0\_cont}^{G} \quad (10b)$$

$$D_{OUT}^{B} = \frac{D_{OUT}^{MAX} - \text{CP0\_cont}^{B}}{D_{IN}^{MAX}} \cdot D_{IN}^{B} + \text{CP0\_cont}^{B} \quad (10c)$$

Figure 8:
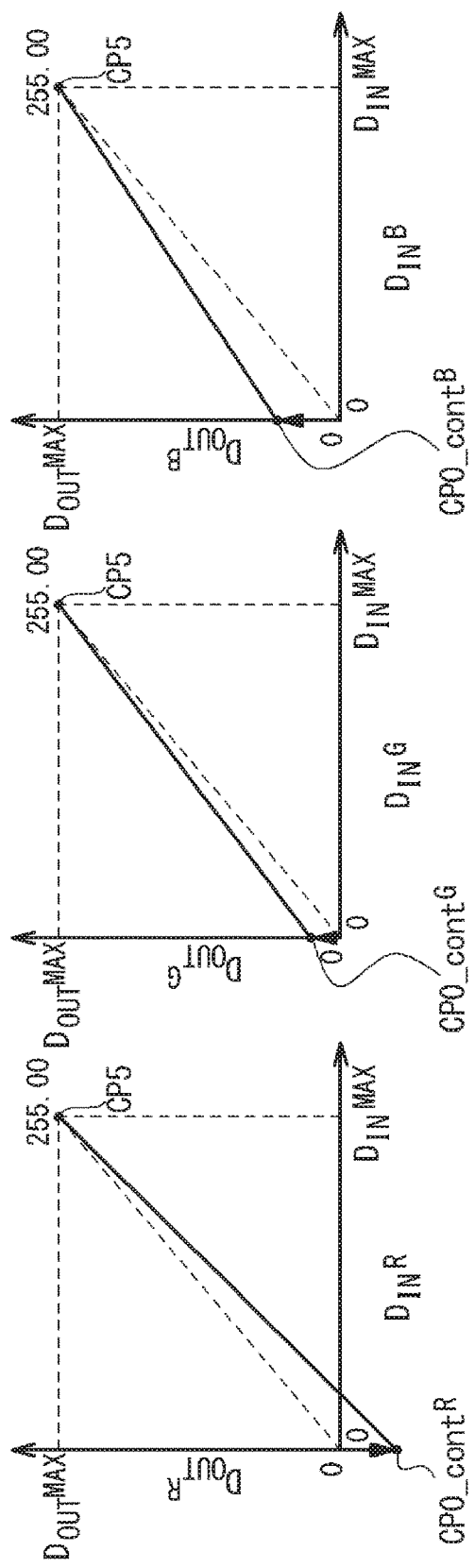
FIG. 8 is a graph illustrating the relation between R data, G data and B data of input image data and R data, G data and B data of output image data in the first embodiment.

FIG. 8 illustrates the respective relations between the R data $D_{IN}^{R}$, G data $D_{IN}^{G}$, and B data $D_{IN}^{B}$ of the input image data $D_{IN}$ and the R data $D_{OUT}^{R}$, G data $D_{OUT}^{G}$, and B data $D_{OUT}^{B}$ of the output image data $D_{OUT}$ in the case when the R data $D_{OUT}^{R}$, G data $D_{OUT}^{G}$, and B data $D_{OUT}^{B}$ of the output image data $D_{OUT}$ are calculated in accordance with the above expressions (10a) to (10c). In FIG. 8, the symbol "CP5" denotes the end point of each input-output curve. It should be noted that at least one of the starting point control data $\text{CP0\_cont}^{R}$, $\text{CP0\_cont}^{G}$, and $\text{CP0\_cont}^{B}$ is positive and at least another one is negative. This is because the starting point control data $\text{CP0\_cont}^{R}$, $\text{CP0\_cont}^{G}$, and $\text{CP0\_cont}^{B}$ are calculated in accordance with expressions (9a) to (9c) and at least one of the differences Rdist, Gdist, and Bdist is positive and at least another one is negative, where the luminance value $Y_{PIXEL}$ is a weighted average of the R data $D_{IN}^{R}$, G data $D_{IN}^{G}$, and B data $D_{IN}^{B}$ of the input image data $D_{IN}$. It would be easily understood from FIG. 8 that the processing in accordance with expressions (10a) to (10c) effectively enhances the saturation, as at least one of the starting point control data $\text{CP0\_cont}^{R}$, $\text{CP0\_cont}^{G}$, and $\text{CP0\_cont}^{B}$ is positive and at least another one is negative.

The output image data $D_{OUT}$ calculated by the linear function correction circuit 22 with the above-described series of expressions are forwarded to the color reduction circuit 23. In the color reduction circuit 23, a color reduction is performed on the output image data $D_{OUT}$ to generate the color-reduced image data $D_{OUT\_D}$. The color-reduced image data $D_{OUT\_D}$ are forwarded to the data line drive circuit 26 via the latch circuit 24 and the data lines 8 of the LCD panel 2 are driven in response to the color-reduced image data $D_{OUT\_D}$.

The above-described saturation enhancement processing in the present embodiment effectively achieves saturation enhancement only with simple processing. This effectively contributes the reduction of the circuit size of an image processing circuit used for the saturation enhancement (the starting point control circuit 28 and the linear function correction circuit 22 in this embodiment).

It should be also noted that the saturation enhancement processing in the present embodiment only causes a reduced change in the luminance value $Y_{PIXEL}$ of each pixel. In the following, a description is given of the fact that the saturation enhancement processing in the present embodiment only causes a reduced change in the luminance value $Y_{PIXEL}$, with a specific numerical example.

In the following, the case is considered when $R_j$, $G_j$, and $B_j$, which are the values of the R data $D_{IN}^{R}$, G data $D_{IN}^{G}$, and B data $D_{IN}^{B}$ of the input image data $D_{IN}$, are 50, 100, and 200, respectively. In this case, the luminance value $Y_{PIXEL}$ is obtained in accordance with expression (2c) as follows:

$$Y_{PIXEL} = 0.2126 \times 50 + 0.7152 \times 100 + 0.0722 \times 200 = 96.59 \approx 97.$$

It should be noted that the value "97" is obtained by rounding to handle the luminance value $Y_{PIXEL}$ as an integer representable with eight bits.

The differences Rdist, Gdist, and Bdist are calculated in accordance with expressions (3a) to (3c) as follows:

$$R\text{dist} = 50 - 97 = -47,$$

$$G\text{dist} = 100 - 97 = 3, \text{ and}$$

$$B\text{dist} = 200 - 97 = 103.$$

With expressions (7a) to (7c) for β being 127, the enhancement coefficients $\text{INST}^{R}$, $\text{INST}^{G}$, and $\text{INST}^{B}$ are obtained as follows:

$$\text{INST}^{R} = 50/127,$$

$$\text{INST}^{G} = 100/127, \text{ and}$$

$$\text{INST}^{B} = (255-200)/127 = 55/127.$$

Since the enhancement coefficient INST is defined as the minimum value of the enhancement coefficients $\text{INST}^{R}$, $\text{INST}^{G}$, and $\text{INST}^{B}$ (see expression (8)), the enhancement coefficient INST is obtained as follows:

$$\text{INST} = 50/127.$$

The starting point control data $\text{CP0\_cont}^{R}$, $\text{CP0\_cont}^{G}$, and $\text{CP0\_cont}^{B}$ are obtained by expressions (9a) to (9c). It should be noted that, with respect to $(D_{IN}^{MAX} - S_{AVE})/D_{IN}^{MAX}$ recited in expressions (9a) to (9c), it holds:

$$0 \leq (D_{IN}^{MAX} - S_{AVE})/D_{IN}^{MAX} \leq 1.$$

To discuss the change in the luminance value $Y_{PIXEL}$ in the case when the saturation is most strongly enhanced, let us consider the case when $(D_{IN}^{MAX} - S_{AVE})/D_{IN}^{MAX}$ is one; in this case, the saturation is most strongly enhanced. Under this assumption, the starting point control data $\text{CP0\_cont}^{R}$, $\text{CP0\_cont}^{G}$, and $\text{CP0\_cont}^{B}$ are obtained by expressions (9a) to (9c) as follows:

$$\text{CP0\_cont}^{R} = (50/127) \times 1 \times (-47) = -18.50 \approx -19,$$

$$\text{CP0\_cont}^{G} = (50/127) \times 1 \times 3 = 1.18 \approx 1, \text{ and}$$

$$\text{CP0\_cont}^{B} = (50/127) \times 1 \times 103 = 44.55 \approx 45.$$

The values of the R data $D_{OUT}^{R}$, G data $D_{OUT}^{G}$ and B data $D_{OUT}^{B}$ are obtained with expressions (10a) to (10c) as follows:

$$D_{OUT}^{R} = \{(255.00 + 19)/255\} \times 50 - 19 = 34.72 \approx 34.75,$$

$$D_{OUT}^{G} = \{(255.00 + 3)/255\} \times 100 + 3 = 101.82 \approx 101.75, \text{ and}$$

$$D_{OUT}^{B} = \{(255.00 - 103)/255\} \times 200 + 103 = 222.21 \approx 222.25.$$

Note that the values of the R data $D_{OUT}^{R}$, G data $D_{OUT}^{G}$, and B data $D_{OUT}^{B}$ are represented with 10 bits, taking a value from 0.00 to 255.00 in increments of 0.25.

The luminance value $Y_{PIXEL}'$ after the saturation enhancement processing is calculated from the thus-obtained output image data $D_{OUT}$ as follows:

$$Y'_{PIXEL} = 0.2126 \times 34.75 + 0.7152 \times 101.75 + 0.0722 \times 222.25 = 96.2059$$

This result proves that the saturation enhancement processing in the present embodiment causes only a reduced change in the luminance value, since the luminance value $Y_{PIXEL}$ calculated from the original input image data $D_{IN}$ is 96.59. The reduced change in the luminance value caused by the saturation enhancement processing results from that the enhancement coefficient INST is calculated with a function $f(x)$ and $\beta$, where $\beta$ is determined as $D_{IN}^{MAX}/2$ or a value close to $D_{IN}^{MAX}/2$, and the function $f(x)$ satisfies the following conditions (a) to (c):
(a) $f(x)$ takes the maximum value when x is $\beta$;
(b) $f(x)$ monotonically increases as x increases when x is less than $\beta$; and
(c) $f(x)$ monotonically decreases as x increases when x is more than $\beta$.
The calculation of the enhancement coefficient INST in this way effectively reduces changes in the luminance value in performing the saturation enhancement processing.

Second Embodiment

Figure 1B:
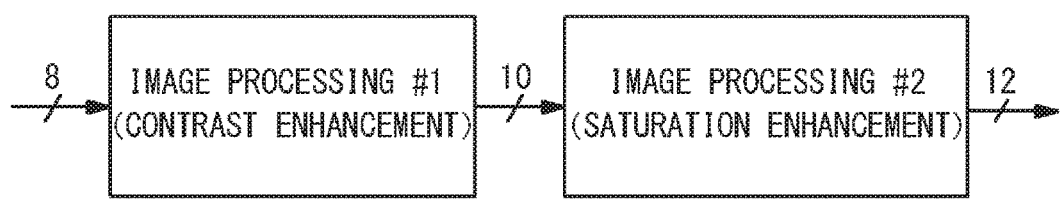
FIG. 1B illustrates an example of a system which performs a contrast enhancement and saturation enhancement in series.
Figure 9:
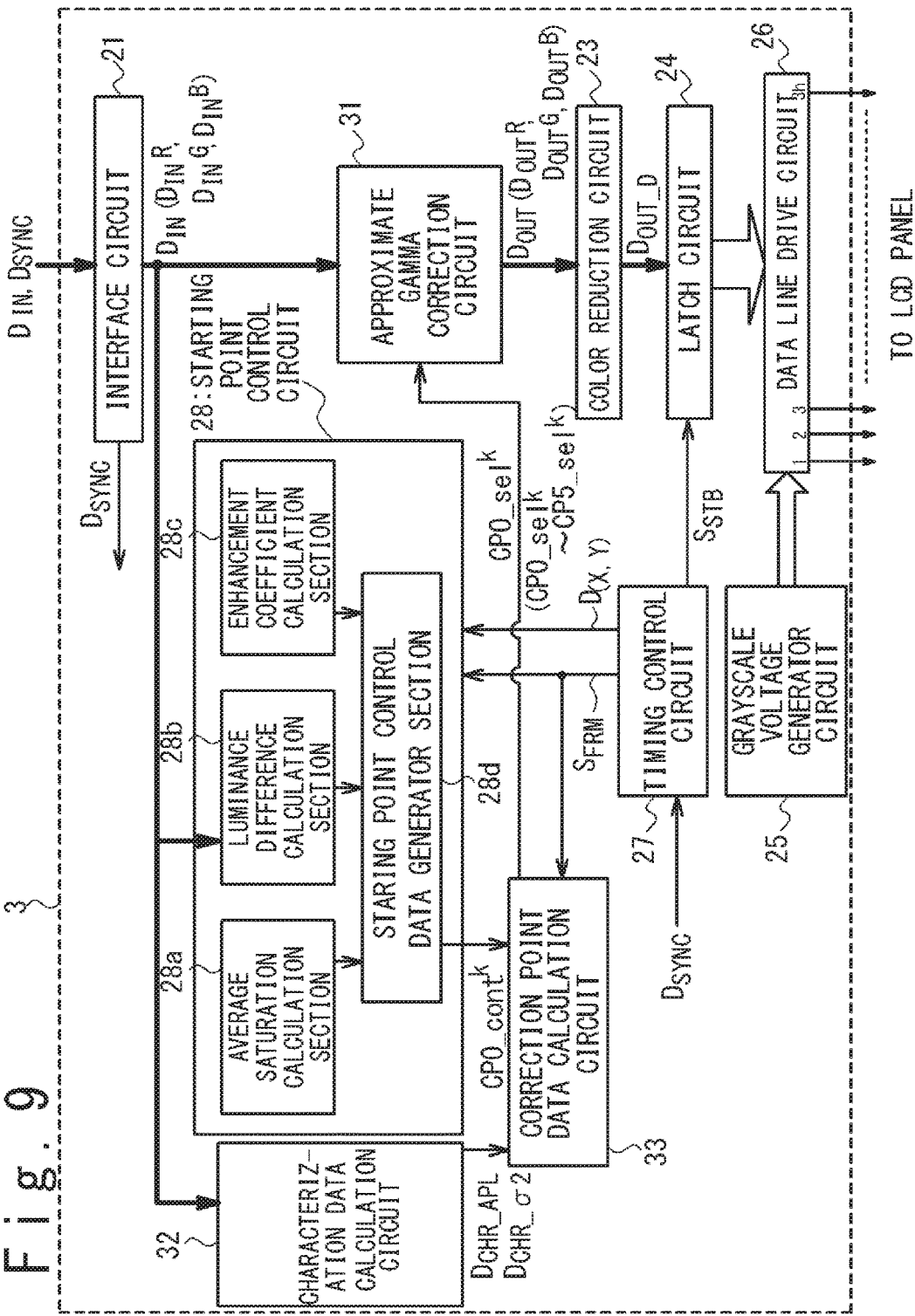
FIG. 9 is a block diagram illustrating an exemplary configuration of a driver IC in a second embodiment of the present invention.

FIG. 9 is a block diagram illustrating an example of the configuration of the driver IC 3 in a second embodiment. In the second embodiment, saturation enhancement and contrast enhancement are concurrently achieved, not by a series of processes as illustrated in FIG. 1B. Concurrently performing saturation enhancement and contrast enhancement is effective for reducing the circuit size. In the present embodiment, in order to concurrently achieve saturation enhancement and contrast enhancement, an approximate gamma correction circuit 31 is used in place of the linear function correction circuit 22, and a characterization data calculation circuit 32 and a correction point data calculation circuit 33 are additionally integrated in the driver IC 3.

The approximate gamma correction circuit 31 performs correction calculations based on an approximate expression of the gamma correction on the input image data $D_{IN}$ to generate the output image data $D_{OUT}$. In the present embodiment, the input-output curves used in the correction calculations in the approximate gamma correction circuit 31 are each determined as a curve obtained by modifying a gamma curve specified by a certain gamma value so as to achieve contrast enhancement. It should be noted that, in the present embodiment, contrast enhancement is achieved to some degree by using a gamma curve as each input-output curve and additional contrast enhancement is achieved by modifying the shape of the gamma curve.

The shapes of the input-output curves used in the correction calculation by the approximate gamma correction circuit 31 are specified by correction point data sets $CP\_sel^R$, $CP\_sel^G$, and $CP\_sel^B$ received from the correction point data calculation circuit 33. The shape of the input-output curve used in the correction calculation for the R data $D_{IN}^R$ of the input image data $D_{IN}$ is specified by the correction point data set $CP\_sel^R$. Correspondingly, the shape of the input-output curve used in the correction calculation for the G data $D_{IN}^G$ of the input image data $D_{IN}$ is specified by the correction point data set $CP\_sel^G$, and the shape of the input-output curve used in the correction calculation for the B data $D_{IN}^B$ of the input image data $D_{IN}$ is specified by the correction point data set $CP\_sel^B$.

The characterization data calculation circuit 32 generates characterization data indicating one or more feature quantities of each frame image (the image displayed in the display region 5 in each frame period) on the basis of the input image data $D_{IN}$. In the present embodiment, the characterization data include APL data $D_{CHR\_APL}$ indicating the average picture level (APL) of each frame image, and variance data $D_{CHR\_\sigma2}$ indicating the variance of the luminance values of the pixels of each frame image. Note that the calculation of the APL data $D_{CHR\_APL}$ and variance data $D_{CHR\_\sigma2}$ may be performed once for each frame period.

The correction point data calculation circuit 33 calculates the above-described correction point data sets $CP\_sel^R$, $CP\_sel^G$, and $CP\_sel^B$ in response to the characterization data generated by the characterization data calculation circuit 32 (in the present embodiment, the APL data $D_{CHR\_APL}$ and variance data $D_{CHR\_\sigma2}$) and the starting point control data $CP0\_cont^R$, $CP0\_cont^G$, and $CP0\_cont^B$ generated by the starting point control circuit 28. Overall, the correction point data calculation circuit 33 functions as a correction control circuitry which controls the shapes of the input-output curves in response to the characterization data (the APL data $D_{CHR\_APL}$ and variance data $D_{CHR\_\sigma2}$) generated by the characterization data calculation circuit 32 and adjusts the positions of the starting points of the input-output curves in response to the starting point control data $CP0\_cont^R$, $CP0\_cont^G$, and $CP0\_cont^B$.

Figure 10:
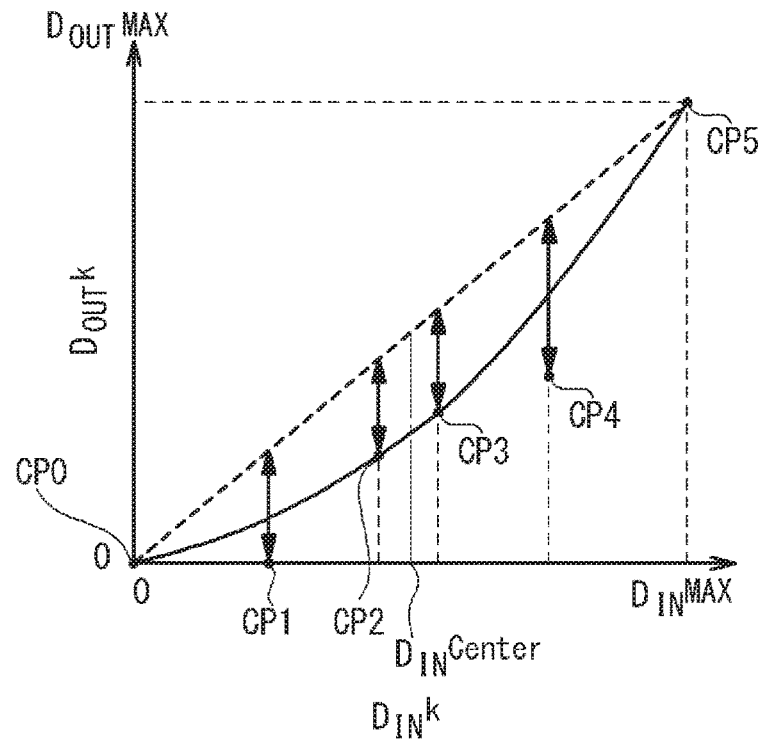
FIG. 10 illustrates a gamma curve specified by each correction point data set and contents of a correction calculation (or gamma correction) in accordance with the gamma curve.

FIG. 10 illustrates the input-output curve specified by each correction point data set $CP\_sel^k$ generated by the correction point data calculation circuit 33 and the contents of the correction calculation in accordance with the input-output curve. Each correction point data set $CP\_sel^k$ includes correction point data CP0 to CP5. The correction point data CP0 to CP5 are each defined as data indicating a point in a coordinate system in which input image data $D_{IN}^k$ are associated with the horizontal axis (or a first axis) and output image data $D_{OUT}^k$ are associated with the vertical axis (or a second axis). The correction point data CP0 indicate the position of the starting point of the input-output curve, which may be denoted also by symbol "CP0", and the correction point data CP5 indicate the position of the end point of the input output curve, which may be denoted also by symbol "CP5". The correction point data CP2 and CP3 respectively indicate the positions of correction points which the input-output curve passes through near the center of the input-output curves, which may be denoted also by symbols "CP2" and "CP3", respectively. The correction point data CP1 indicate the position of a correction point located between the correction points CP0 and CP2, which is denoted also by symbol "CP1", and the correction point data CP4 indicate the position of a correction point located between the correction points CP3 and CP5, which is also denoted by symbol "CP4". The shape of the gamma curve is specified by appropriately determining the positions of the correction points CP0 to CP0 indicated by the correction point data CP0 to CP5.

As illustrated in FIG. 10, for example, it is possible to specify the shape of a gamma curve as being convex downward by determining the positions of the correction points CP1 to CP4 as being lower than the straight line connecting the both ends of the gamma curve. In the approximate gamma correction circuit 31, the output image data $D_{OUT}^k$ are generated by performing a gamma correction in accordance with the gamma curve with the shape specified by the correction point data CP0 to CP5 included in the correction point data set CP_sel$^k$. As described later in detail, the correction point data CP0 to CP5 of the correction point data sets CP_sel$^R$, CP_sel$^G$ and CP_sel$^B$ are determined in response to the characterization data (in the present embodiment, APL data D$_{CHR\_APL}$ and variance data D$_{CHR\_o2}$) generated by the characterization data calculation circuit 32. This effectively allows controlling the shapes of the input-output curves used in the correction calculations of the R data D$_{IN}^R$, G data D$_{IN}^G$ and B data D$_{IN}^B$ of the input image data D$_{IN}$ in response to the characterization data. Furthermore, the correction point data CP0 of the correction point data sets CP_sel$^R$, CP_sel$^G$ and CP_sel$^B$ are adjusted in response to the starting point control data CP0_cont$^R$, CP0_cont$^G$ and CP0_cont$^B$, respectively. This effectively allows adjusting the positions of the starting points of the input-output curves used in the correction calculations of the R data D$_{IN}^R$, G data D$_{IN}^G$ and B data D$_{IN}^B$ of the input image data D$_{IN}$, to thereby achieve saturation enhancement.

Figure 11:
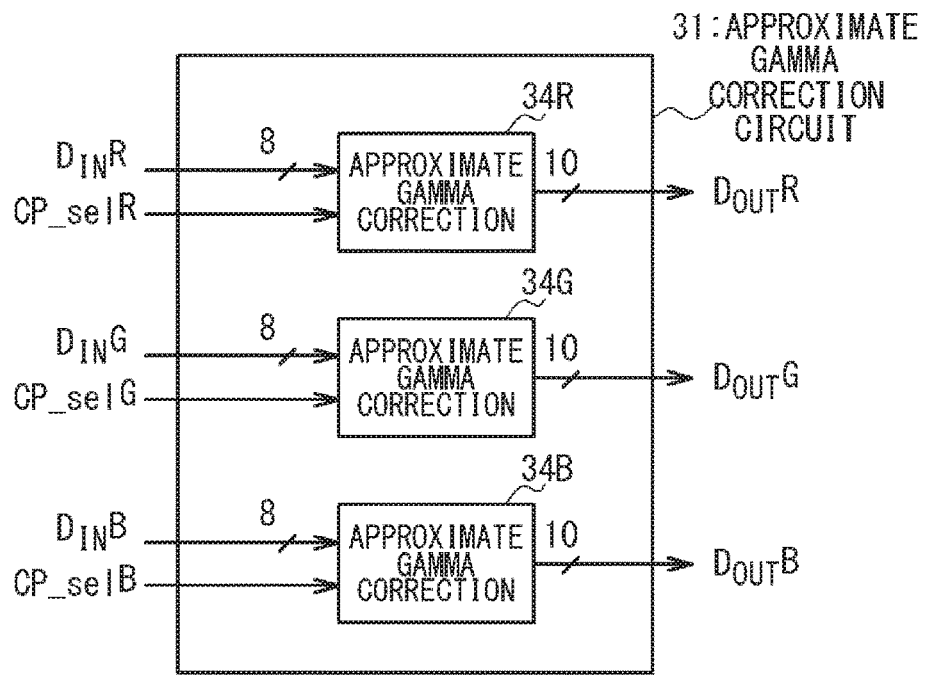
FIG. 11 is a block diagram illustrating an example of the configuration of an approximate gamma correction circuit in the second embodiment.

FIG. 11 is a block diagram illustrating an example of the configuration of the approximate gamma correction circuit 31. The approximate gamma correction circuit 31 includes approximate gamma correction units 34R, 34G and 34B, which are prepared for the R data D$_{IN}^R$, G data D$_{IN}^G$ and B data D$_{IN}^B$ of the input image data D$_{IN}$, respectively. The approximate gamma correction unit 34R performs a correction calculation with an arithmetic expression on the R data D$_{IN}^R$ of the input image data D$_{IN}$ to generate the R data D$_{OUT}^R$ of the output image data D$_{OUT}$. Correspondingly, the approximate gamma correction units 34G and 34B perform correction calculations with arithmetic expressions on the G data D$_{IN}^G$ and B data D$_{IN}^B$ of the input image data D$_{IN}$ to generate the G data D$_{OUT}^G$ and B data D$_{OUT}^B$ of the output image data D$_{OUT}$, respectively. As described above, the number of bits of the R data D$_{OUT}^R$, G data D$_{OUT}^G$ and B data D$_{OUT}^B$ of output image data D$_{OUT}$ is ten bits in the present embodiment; this means that the number of bits of the R data D$_{OUT}^R$, G data D$_{OUT}^G$ and B data D$_{OUT}^B$ of the output image data D$_{OUT}$ is larger than that of the R data D$_{IN}^R$, G data D$_{IN}^G$ and B data D$_{IN}^B$ of the input image data D$_{IN}$.

Coefficients of the arithmetic expression used for the correction calculation by the approximate gamma correction unit 34R are determined depending on the correction point data CP0 to CP5 of the correction point data set CP_sel$^R$. Correspondingly, coefficients of the arithmetic expressions used for the correction calculation by the approximate gamma correction units 34G and 34B are determined depending on the correction point data CP0 to CP5 of the correction point data set CP_sel$^G$ and CP_sel$^B$, respectively.

Figure 12:
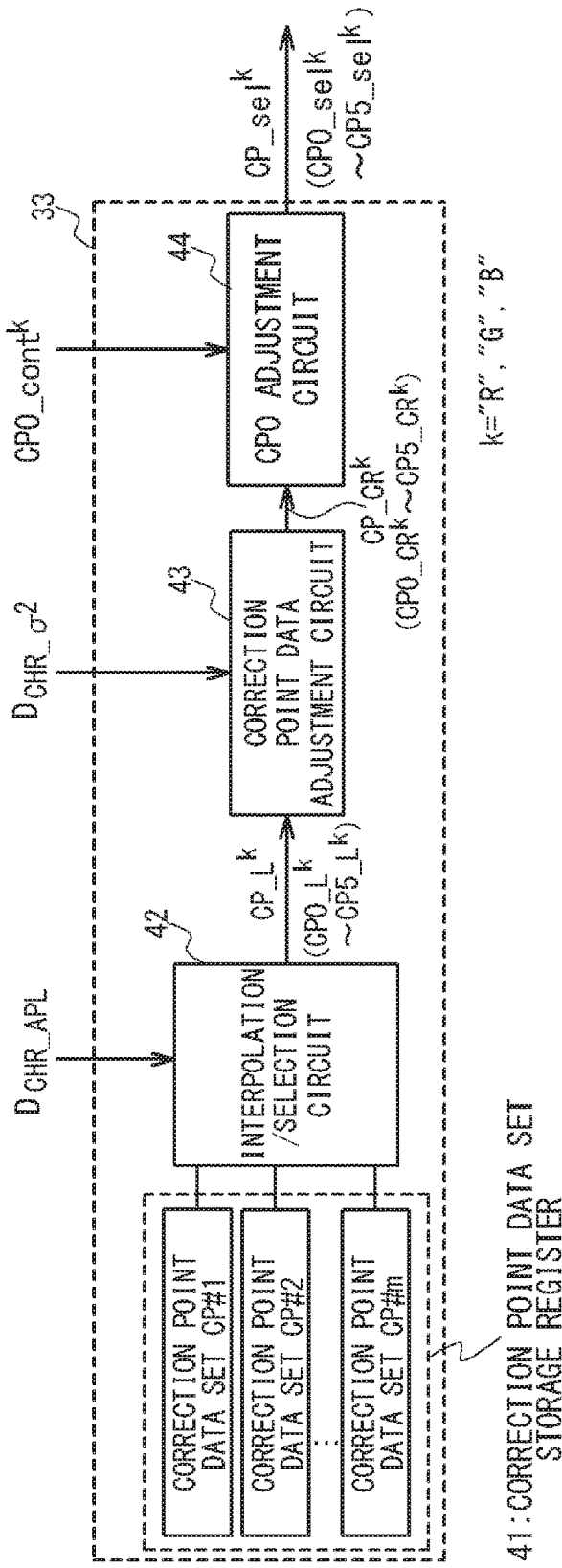
FIG. 12 is a block diagram illustrating an example of the configuration of a correction point data calculation circuit in the second embodiment.

FIG. 12 is a block diagram illustrating an example of the configuration of the correction point data calculation circuit 33. In the example illustrated in FIG. 12, the correction point data calculation circuit 33 includes: a correction point data set storage register 41, an interpolation/selection circuit 42 and a correction point data adjustment circuit 43 and a CP0 adjustment circuit 44.

The correction point data set storage register 41 stores therein a plurality of correction point data sets CP#1 to CP#m. The correction point data sets CP#1 to CP#m are used as seed data for determining the above-described correction point data sets CP_sel$^R$, CP_sel$^G$ and CP_sel$^B$. Each of the correction point data sets CP#1 to CP#m includes correction point data CP0 to CP5 defined as illustrated in FIG. 10.

The interpolation/selection circuit 42 determines gamma values γ_PIXEL$^R$, γ_PIXEL$^G$ and γ_PIXEL$^B$ on the basis of the APL data D$_{CHR\_APL}$ received from the characterization data calculation circuit 32 and determines correction point data sets CP_L$^R$, CP_L$^G$ and CP_L$^B$ corresponding to the gamma values γ_PIXEL$^R$, γ_PIXEL$^G$ and γ_PIXEL$^B$ thus determined. Here, the gamma value γ_PIXEL$^R$ is the gamma value of the gamma curve used for the correction calculation performed on the R data D$_{IN}^R$ of the input image data D$_{IN}$. Correspondingly, the gamma value γ_PIXEL$^G$ is the gamma value of the gamma curve used for the correction calculation performed on the G data D$_{IN}^G$ of the input image data D$_{IN}$ and the gamma value γ_PIXEL$^B$ is the gamma value of the gamma curve used for the correction calculation performed on the B data D$_{IN}^B$ of the input image data D$_{IN}$.

In one embodiment, the interpolation/selection circuit 42 may select one of the correction point data sets CP#1 to CP#m on the basis of the gamma value γ_PIXEL$^k$ and determine the correction point data set CP_L$^k$ as the selected one of the correction point data sets CP#1 to CP#m. Alternatively, the interpolation/selection circuit 42 may determine the correction point data set CP_L$^k$ by selecting two of correction point data sets CP#1 to CP#m on the basis of the gamma value γ_PIXEL$^k$ and applying an interpolation to the selected two correction point data sets. Details of the determination of the correction point data sets CP_L$^R$, CP_L$^G$ and CP_L$^B$ are described later. The correction point data sets CP_L$^R$, CP_L$^G$ and CP_L$^B$ determined by the interpolation/selection circuit 42 are forwarded to the correction point data adjustment circuit 43.

The correction point data adjustment circuit 43 modifies the correction point data sets CP_L$^R$, CP_L$^G$ and CP_L$^B$ in response to the variance data D$_{CHR\_o2}$ received from the characterization data calculation circuit 32. This operation of the correction point data adjustment circuit 43 is technically equivalent to processing to modify the shape of the gamma curve specified by the gamma value γ_PIXEL$^k$ in response to the variance data D$_{CHR\_o2}$. As described later, in the present embodiment, the correction point data adjustment circuit 43 modifies the correction point data CP1 and CP4 of the correction point data sets CP_L$^R$, CP_L$^G$ and CP_L$^B$ in response to the variance data D$_{CHR\_o2}$, to thereby achieve contrast enhancement.

The CP0 adjustment circuit 44 modifies the correction point data sets CP_L$^R$, CP_L$^G$ and CP_L$^B$ in response to the starting point control data CP0_cont$^R$, CP0_cont$^G$ and CP0_cont$^B$ received from the starting point control circuit 28. This operation of the CP0 adjustment circuit 4 is technically equivalent to processing to adjust the positions of the starting points of the input-output curves in response to the starting point control data CP0_cont$^R$, CP0_cont$^G$ and CP0_cont$^B$. The correction point data sets CP_L$^R$, CP_L$^G$ and CP_L$^B$ thus modified by the correction point data adjustment circuit 43 and the CP0 adjustment circuit 44 are used as the correction point data sets CP_sel$^R$, CP_sel$^G$ and CP_sel$^B$, which are finally fed to the approximate gamma correction circuit 31.

In the present embodiment, the correction point data sets CP_L$^R$, CP_L$^G$ and CP_L$^B$ are first modified by the correction point data adjustment circuit 43 to generate correction point data sets CP_CR$^B$, CP_CR$^G$ and CP_CR$^B$ and the correction point data sets CP_CR$^B$, CP_CR$^G$ and CP_CR$^B$ are further modified by the CP0 adjustment circuit 44 to thereby generate the correction point data sets CP_sel$^R$, CP_sel$^G$ and CP_sel$^B$, which are finally fed to the approximate gamma correction circuit 31. In an alternative embodiment, the correction point data calculation circuit 33 may be configured so that the correction point data sets CP_L$^R$, CP_L$^G$ and CP_L$^B$ are first modified by the CP0 adjustment circuit 44 and the modified correction point data sets CP_L$^R$, $CP\_L^G$ and $CP\_L^B$ are further modified by the correction point data adjustment circuit 43 to generate the correction point data sets $CP\_sel^R$, $CP\_sel^G$ and $CP\_sel^B$. The correction point data adjustment circuit 43 and the CP0 adjustment circuit 44 may be combined to form a unified circuit. In this case, the unified circuit may modify the correction point data sets $CP\_L^R$, $CP\_L^G$ and $CP\_L^B$ in response to the variance data $D_{CHR\_o2}$ and the starting point control data $CP0\_cont^R$, $CP0\_cont^G$ and $CP0\_cont^B$. Details of the operations of the respective circuits in the correction point data calculation circuit 33 are described later.

Figure 13:
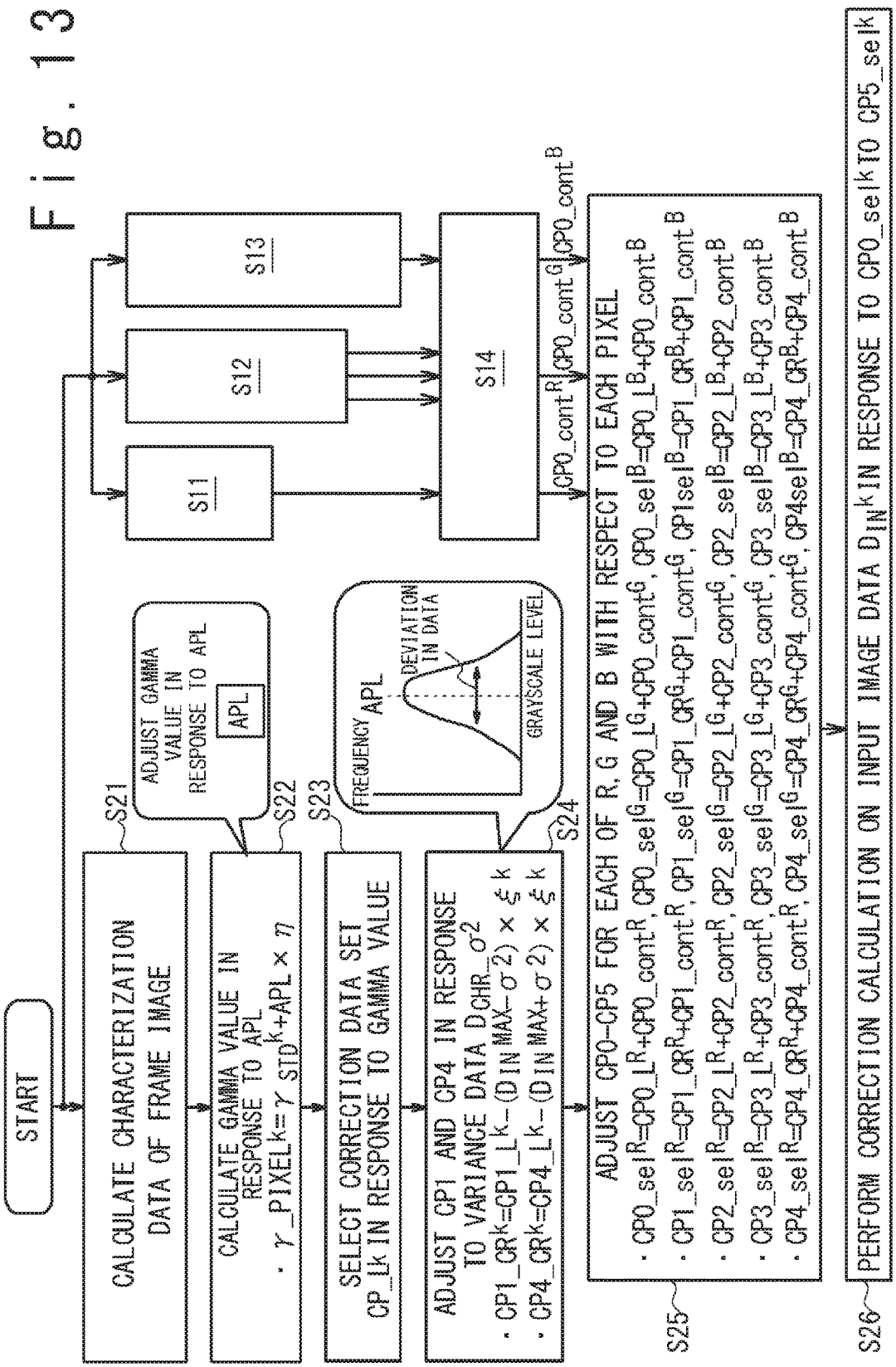
FIG. 13 is a flowchart illustrating the procedure of contrast enhancement processing and saturation enhancement processing in the second embodiment.

FIG. 13 is a flowchart illustrating the procedure of the correction calculation performed on the input image data $D_{IN}$ in the second embodiment. Similarly to the first embodiment, the input image data $D_{IN}$ are fed to the starting point control circuit 28 and the starting point control data $CP0\_cont^R$, $CP0\_cont^G$ and $CP0\_cont^B$ are generated by the starting point control circuit 28 on the basis of the input image data $D_{IN}$ at steps 11 to 14. The starting point control data $CP0\_cont^R$, $CP0\_cont^G$ and $CP0\_cont^B$ are generated through the same processing as in the first embodiment.

At step S21, the input image data $D_{IN}$ are also fed to the characterization data calculation circuit 32 and the APL data $D_{CHR\_APL}$ and variance data $D_{CHR\_o2}$ of each frame image are generated by the characterization data calculation circuit 32 from the input image data $D_{IN}$. As described above, the APL data $D_{CHR\_APL}$ indicate the APL of each frame image and the variance data $D_{CHR\_o2}$ indicate the variance of the luminance values of the pixels in each frame period.

At step S22, the gamma values to be used for the correction calculation of the input image data $D_{IN}$ associated with each pixel 9 in each frame image are calculated from the APL data $D_{CHR\_APL}$ of each frame image. In the present embodiment, a gamma value is calculated for each of the R data $D_{IN}^R$, G data $D_{IN}^G$ and B data $D_{IN}^B$ of the input image data $D_{IN}$ associated with each pixel 9. In detail, the gamma value $\gamma\_PIXEL^R$ to be used for the correction calculation performed on the R data $D_{IN}^R$ of the input image data $D_{IN}$ associated with a certain frame image is calculated by the following expression (11a):

$$\gamma\_PIXEL^R = \gamma\_STD^R + APL \cdot \eta^R, \quad (11a)$$

where $\gamma\_STD^R$ is a given reference gamma value, APL is the average picture level of the certain frame image, and $\eta^R$ is a given positive proportionality constant. It should be noted that, under the definition with expression (11a), the gamma value $\gamma\_PIXEL^R$ increases as the average picture level APL increases.

Correspondingly, the gamma values $\gamma\_PIXEL^G$ and $\gamma\_PIXEL^B$ to be used for the correction calculations performed on the G data $D_{IN}^G$ and B data $D_{IN}^B$ of the input image data $D_{IN}$ associated with the certain frame image are calculated by the following expressions (11b) and (11c):

$$\gamma\_PIXEL^G = \gamma\_STD^G + APL \cdot \eta^G, \text{ and} \quad (11b)$$

$$\gamma\_PIXEL^B = \gamma\_STD^B + APL \cdot \eta^B, \quad (11c)$$

where $\gamma\_STD^G$ and $\gamma\_STD^B$ are given reference gamma values, and $\eta^G$ and $\eta^B$ are given positive proportionality constants. $\gamma\_STD^R$, $\gamma\_STD^G$, and $\gamma\_STD^B$ may be equal to each other, or different, and $\eta^R$, $\eta^G$ and $\eta^B$ may be equal to each other, or different. It should be noted that the gamma values $\gamma\_PIXEL^R$, $\gamma\_PIXEL^G$, and $\gamma\_PIXEL^B$ are calculated for each frame image.

When $\gamma\_STD^R$, $\gamma\_STD^G$, and $\gamma\_STD^B$ are equal to each other and $\eta^R$, $\eta^G$, and $\eta^B$ are equal to each other, a common gamma value is calculated for the R data $D_{IN}^R$, G data $D_{IN}^G$ and B data $D_{IN}^B$ of the input image data $D_{IN}$; in this case, the common gamma value $\gamma\_PIXEL$ is calculated by the following expression (11d):

$$\gamma\_PIXEL = \gamma\_STD + APL \cdot \eta. \quad (11d)$$

At step S23, the correction point data sets $CP\_L^R$, $CP\_L^G$, and $CP\_L^B$ are selected or determined on the basis of the thus-calculated gamma values $\gamma\_PIXEL^R$, $\gamma\_PIXEL^G$ and $\gamma\_PIXEL^B$, respectively. It should be noted that the correction point data sets $CP\_L^R$, $CP\_L^G$ and $CP\_L^B$ are seed data used for calculating the correction point data sets $CP\_sel^R$, $CP\_sel^G$, and $CP\_sel^B$, which are finally fed to the approximate gamma correction circuit 31. The correction point data sets $CP\_L^R$, $CP\_L^G$ and $CP\_L^B$ are determined for each frame image.

In one embodiment, the correction point data sets $CP\_L^R$, $CP\_L^G$, and $CP\_L^B$ are each selected from the correction point data sets CP#1 to CP#m stored in the correction point data set storage register 41 of the correction point data calculation circuit 33. As described above, the correction point data sets CP#1 to CP#m correspond to different gamma values γ and each of the correction point data sets CP#1 to CP#m includes correction point data CP0 to CP5.

The correction point data CP0 to CP5 of a correction point data set CP#j corresponding to a certain gamma value γ are determined as follows:

(1) For $y < 1$, (12a)
$CP0 = 0$
$CP1 = \dfrac{4 \cdot Gamma[K/4] - Gamma[K]}{2}$
$CP2 = Gamma[K-1]$
$CP3 = Gamma[K]$
$CP4 = 2 \cdot Gamma[(D_{IN}^{MAX} + K - 1)/2] - D_{OUT}^{MAX}$
$CP5 = D_{OUT}^{MAX}$
and (2) for $y \geq 1$, (12b)
$CP0 = 0$
$CP1 = 2 \cdot Gamma[K/2] - Gamma[K]$
$CP2 = Gamma[K-1]$
$CP3 = Gamma[K]$
$CP4 = 2 \cdot Gamma[(D_{IN}^{MAX} + K - 1)/2] - D_{OUT}^{MAX}$
$CP5 = D_{OUT}^{MAX}$ where $D_{IN}^{MAX}$ is the allowed maximum value of the R data $D_{IN}^R$, G data $D_{IN}^G$ and B data $D_{IN}^B$ of the input image data $D_{IN}$; $D_{IN}^{MAX}$ depends on the number of bits of the R data $D_{IN}^R$, G data $D_{IN}^G$, and B data $D_{IN}^B$. Similarly, $D_{OUT}^{MAX}$ is the allowed maximum value of the R data $D_{OUT}^R$, G data $D_{OUT}^G$ and B data $D_{OUT}^B$ of the output image data $D_{OUT}$; $D_{OUT}^{MAX}$ depends on the number of bits of the R data $D_{OUT}^R$, G data $D_{OUT}^G$ and B data $D_{OUT}^B$. K is a constant given by the following expression (13a):

$$K = (D_{IN}^{MAX} + 1)/2. \quad (13a)$$

In the above, the function Gamma [x], which is a function corresponding to the strict expression of the gamma correction, is defined by the following expression:

$$Gamma[x] = D_{OUT}^{MAX} \cdot (x/D_{IN}^{MAX})^\gamma \quad (13b)$$

In the present embodiment, the correction point data sets CP#1 to CP#m are determined so that the gamma value γ recited in expression (13b) to which a correction point data set CP#j selected from the correction point data sets CP#1 to CP#m corresponds is increased as j is increased. In other words, it holds:

$$\gamma_1 < \gamma_2 < \ldots < \gamma_{m-1} < \gamma_m, \quad (14)$$

where $\gamma_j$ is the gamma value corresponding to the correction point data set CP#j.

Figure 14:
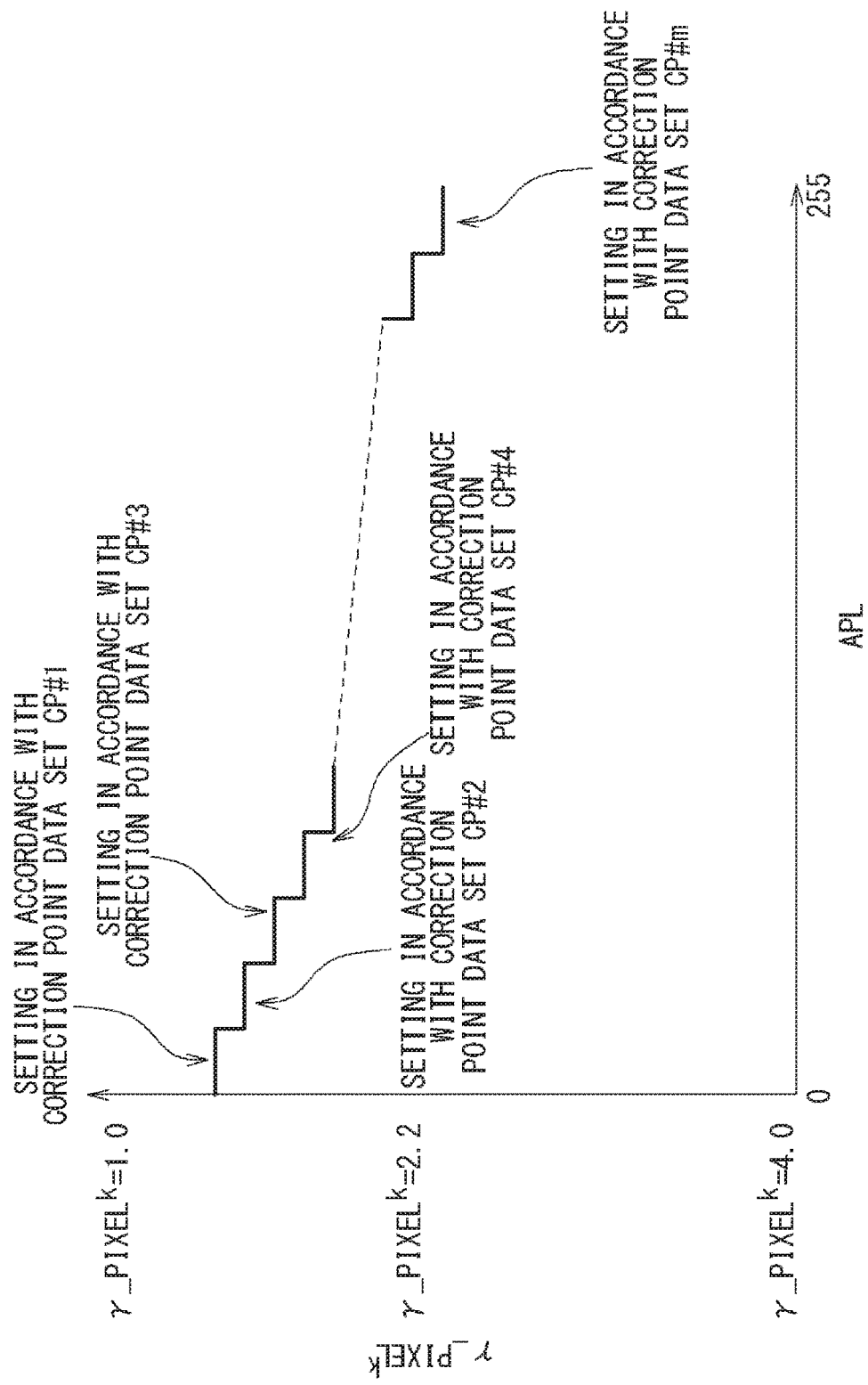
FIG. 14 is a graph illustrating the relation among APL, $\gamma\_PIXEL^k$ and a correction point data set $CP\_L^k$ in one embodiment.

In one embodiment, the correction point data set $CP\_L^R$ is selected from the correction point data sets CP#1 to CP#m on the basis of the gamma value $\gamma\_PIXEL^R$. The correction point data set $CP\_L^R$ is determined as a correction point data set CP#j with a larger value of j as the gamma value $\gamma\_PIXEL^R$ increases. Correspondingly, the correction point data sets $CP\_L^G$ and $CP\_L^B$ are selected from the correction point data sets CP#1 to CP#m on the basis of the gamma values $\gamma\_PIXEL^G$ and $\gamma\_PIXEL^B$, respectively. FIG. 14 is a graph illustrating the relation among the average picture level (APL) of each frame image, $\gamma\_PIXEL^k$ and the correction point data set $CP\_L^k$ in the case when the correction point data set $CP\_L^k$ is determined in this manner. As the average picture level of each frame image increases, the gamma value $\gamma\_PIXEL^k$ is increased and a correction point data set CP#j with a larger value of j is selected as the correction point data set $CP\_L^k$.

In an alternative embodiment, the correction point data sets $CP\_L^R$, $CP\_L^G$, and $CP\_L^B$ may be determined as follows: The correction point data sets CP#1 to CP#m are stored in the correction point data set storage register 41 of the correction point data calculation circuit 33. The number of the correction point data sets CP#1 to CP#m stored in the correction point data set storage register 41 is $2^{P-(Q-1)}$, where P is the number of bits used to describe the average picture level (APL) of each frame image and Q is a predetermined integer equal to more than two and less than P. This implies that $m=2^{P-(Q-1)}$. The correction point data sets CP#1 to CP#m to be stored in the correction point data set storage register 41 may be fed from the processor 4 to the drive IC 3 as initial settings.

Furthermore, two correction point data sets CP#q and CP#(q+1) are selected on the basis of the gamma value $\gamma\_PIXEL^k$ (k is any one of "R", "G" and "B") from among the correction point data sets CP#1 to CP#m stored in the correction point data set storage register 41 for determining the correction point data set $CP\_L^k$, where q is an integer from one to m−1. The two correction point data sets CP#q and CP#(q+1) are selected to satisfy the following expression:

$$\gamma_q < \gamma\_PIXEL^k < \gamma_{q+1}. \quad (15)$$

The correction point data CP0 to CP5 of the correction point data set $CP\_L^k$ are respectively calculated with an interpolation of correction point data CP0 to CP5 of the selected two correction point data sets CP#q and CP#(q+1).

Figure 15:
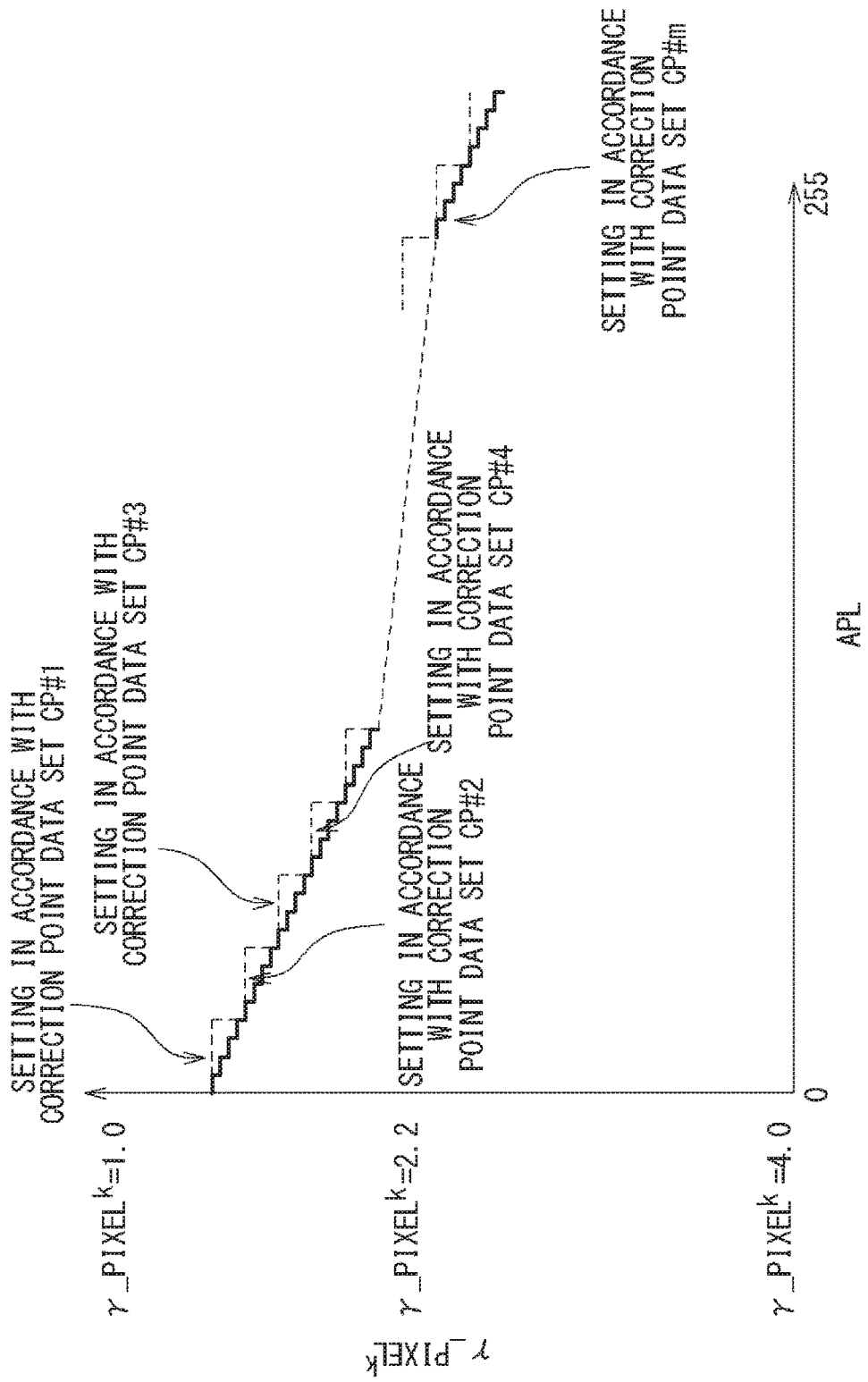
FIG. 15 a graph illustrating the relation among APL, $\gamma\_PIXEL^k$ and a correction point data set $CP\_L^k$ in another embodiment.

More specifically, the correction point data CP0 to CP5 of the correction point data set $CP\_L^k$ (where k is any of "R", "G" and "B") are calculated from the correction point data CP0 to CP5 of the selected two correction point data sets CP#q and CP#(q+1) in accordance with the following expressions:

$$CP\alpha\_L^k = CP\alpha(\#q) + \{(CP\alpha(\#(q+1)) - CP\alpha(\#q))/2^Q\} \times APL\_PIXEL[Q-1:0], \quad (16)$$

where α is an integer from zero to five, $CP\alpha\_L^k$ is the correction point data CPα of correction point data set $CP\_L^k$, CPα(#q) is the correction point data CPα of the selected correction point data set CP#q, CPα(#(q+1)) is the correction point data CPα of the selected correction point data set CP#(q+1), and APL[Q−1:0] is the lowest Q bits of the average picture level of each frame image. FIG. 15 is a graph illustrating the relation among the average picture level (APL), $\gamma\_PIXEL^k$ and the correction point data set $CP\_L^k$ in the case when the correction point data set $CP\_L^k$ is determined in this manner. As the average picture level is increased, the gamma value $\gamma\_PIXEL^k$ is increased and correction point data sets CP#q and CP#(q+1) with a larger value of q are selected. The correction point data set $CP\_L^k$ is determined to correspond to a gamma value in a range from the gamma value $\gamma_q$ to $\gamma_{q+1}$, which the correction point data sets CP#q and CP#(q+1) respectively correspond to.

Figure 16:
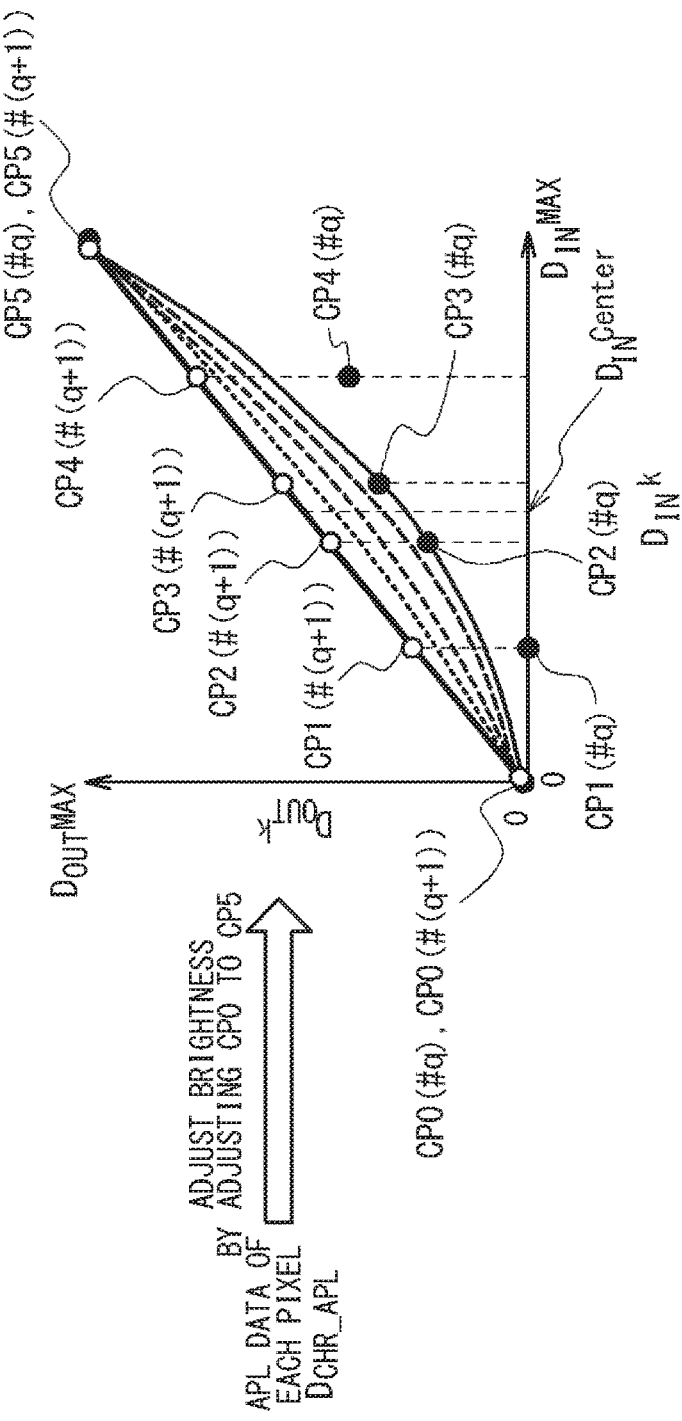
FIG. 16 is a graph schematically illustrating the shapes of gamma curves respectively corresponding to correction point data sets CP#q and CP#(q+1) and the gamma curve corresponding to the correction point data set $CP\_L^k$.

FIG. 16 is a graph schematically illustrating the shapes of the gamma curves corresponding to the correction point data sets CP#q and CP#(q+1) and the correction point data set $CP\_L^k$. Since the correction point data CPα of the correction point data set $CP\_L^k$ is obtained through the interpolation of the correction point data CPα(#q) and CPα(#(q+1)) of the correction point data sets CP#q and CP#(q+1), the shape of the gamma curve corresponding to the correction point data set $CP\_L^k$ is determined so that the gamma curve corresponding to the correction point data set $CP\_L^k$ is located between the gamma curves corresponding to the correction point data sets CP#q and CP#(q+1). The calculation of the correction point data CP0 to CP5 of the correction point data set $CP\_L^k$ through the interpolation of the correction point data CP0 to CP5 of the correction point data sets CP#q and CP#(q+1) is advantageous for allowing finely adjusting the gamma value used for the gamma correction even when only a reduced number of the correction point data sets CP#1 to CP#m are stored in the correction point data set storage register 41.

It should be noted that, when a gamma value $\gamma\_PIXEL$ is calculated commonly for the R data $D_{IN}^R$, G data $D_{IN}^G$ and B data $D_{IN}^B$, a common correction point data set $CP\_L$ is selected or calculated from the gamma value $\gamma\_PIXEL$ in a similar way.

At step S24, the correction point data sets $CP\_L^R$, $CP\_L^G$, and $CP\_L^B$ thus selected or calculated are modified in response to the variance data $D_{CHR\_o2}$ to generate correction point data sets $CP\_CR^R$, $CP\_CR^G$ and $CP\_CR^B$. It should be noted that, since the correction point data sets $CP\_L^R$, $CP\_L^G$ and $CP\_L^B$ each represent the shape of a specific gamma curve, modifying the correction point data sets $CP\_L^R$, $CP\_L^G$ and $CP\_L^B$ in response to the variation data $D_{CHR\_o2}$ is technically equivalent to modifying the shapes of the gamma curves used for the correction calculations in response to the variation data $D_{CHR\_o2}$.

Figure 17:
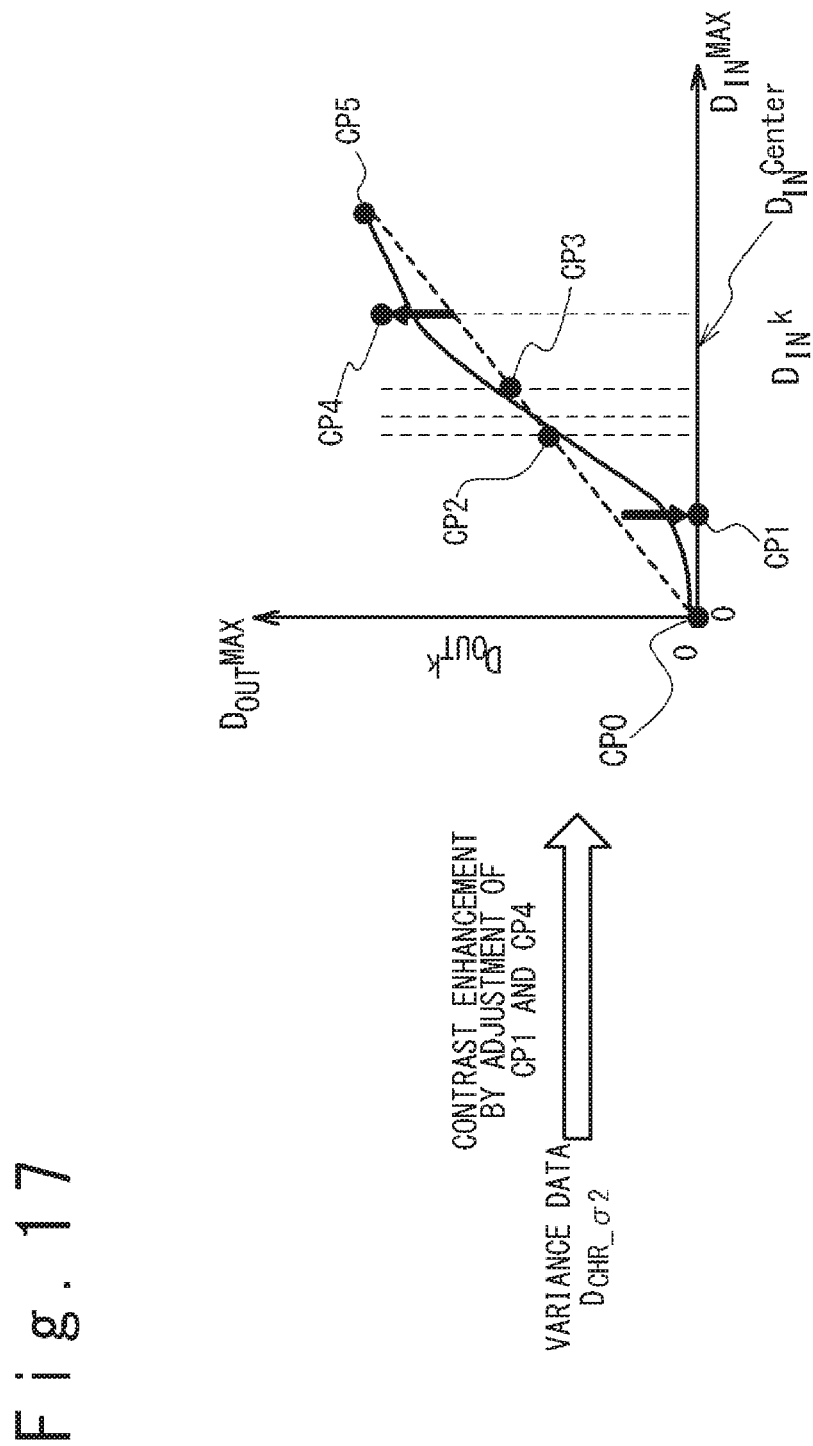
FIG. 17 is a conceptual diagram illustrating a technical significance of modification of the correction point data set $CP\_L^k$ on the basis of variance data $D_{CHR\_o2}$.

FIG. 17 is a conceptual diagram illustrating the technical significance of modification of the correction point data set $CP\_L^k$ on the basis of variance data $D_{CHR\_o2}$. A reduced variance $\sigma^2$ of the luminance values of a certain frame image means that the frame image includes an increased number of pixels with luminance values close to the APL of the frame image. In other words, the contrast of the frame image corresponding to the input image data $D_{IN}$ is small. When the contrast of the frame image corresponding to the input image data $D_{IN}$ is small, it is possible to display the frame image with an improved image quality by performing a correction calculation to enhance the contrast by the approximate gamma correction circuit 31.

Since the correction point data CP1 and CP4 of the correction point data set $CP\_L^k$ largely influence the contrast, the correction point data CP1 and CP4 of the correction point data set $CP\_L^k$ are adjusted on the basis of the variance data $D_{CHR\_o2}$ in the present embodiment. The correction point data CP1 of the correction point data set $CP\_L^k$ is modified so that the correction point data CP1 of the correction point data sets CP_CR$^k$, which is obtained as the result of the modification, is decreased as the variance $\sigma^2$ indicated by the variance data D$_{CHR\_o2}$ decreases. The correction point data CP4 of the correction point data set CP_L$^k$ is, on the other hand, modified so that the correction point data CP4 of the correction point data sets CP_CR$^k$ is increased as the variance $\sigma^2$ indicated by the variance data D$_{CHR\_o2}$ decreases. Such modification results in that the correction calculation in the approximate gamma correction circuit 31 is performed to enhance the contrast, when the contrast of the image corresponding to the input image data D$_{IN}$ is small. It should be noted that the correction point data CP0, CP2, CP3 and CP5 of the correction point data set CP_L$^k$ are not modified in the present embodiment.

At step S25, the correction point data set CP_CR$^R$, CP_CR$^G$, and CP_CR$^B$ are modified in response to the starting point control data CP0_cont$^R$, CP0_cont$^G$, and CP0_cont$^B$ to generate the correction point data sets CP_sel$^R$, CP_sel$^G$ and CP_sel$^B$. In the present embodiment, the starting points of the input-output curves, that is, the correction point data CP0 of the correction point data sets CP_CR$^R$, CP_CR$^G$ and CP_CR$^B$ are modified in response to the starting point control data CP0_cont$^R$, CP0_cont$^G$ and CP0_cont$^B$. Since a correction point data CP0 indicates the position of the starting point of a gamma curve (input-output curve), modifying the correction point data CP0 of the correction point data sets CP_CR$^R$, CP_CR$^G$, and CP_CR$^B$ is technically equivalent to adjusting the positions of the starting points of the gamma curves associated with the correction point data sets CP_CR$^R$, CP_CR$^G$ and CP_CR$^B$.

The correction point data CP1 to CP4 of the correction point data sets CP_CR$^R$, CP_CR$^G$, and CP_CR$^B$ are also modified in accordance with the modification of the correction point data CP0, that is, the adjustment of the positions of the input-output curves. Since the correction point data CP1 to CP4 of the correction point data sets CP_CR$^R$, CP_CR$^G$, and CP_CR$^B$ indicates the shapes of the intermediate portions of the input-output curves, modifying the correction point data CP1 to CP4 of the correction point data sets CP_CR$^R$, CP_CR$^G$ and CP_CR$^B$ is technically equivalent to modifying the shapes of the intermediate portions of the input-output curves. Correction point data corresponding to correction points close to the starting points of the input-output curves (for example, correction point data CP1) are subjected to a relatively large modification and correction point data corresponding to correction points close to the end points of the input-output curves (for example, correction point data CP4) are subjected to a relatively small modification. More specifically, correction point control data CP1_cont$^k$ to CP4_cont$^k$, which indicate the amounts of modifications of the correction point data CP1 to CP4 of the correction point data set CP_CR$^k$, are calculated in accordance with the following expressions (17a) to (17d):

$$CP1\_cont^k = \frac{(D_{OUT}^{MAX} - CP0\_cont^k)}{D_{IN}^{MAX}} \cdot \frac{K}{2} + CP0\_cont^k \quad (17a)$$

$$CP2\_cont^k = \frac{(D_{OUT}^{MAX} - CP0\_cont^k)}{D_{IN}^{MAX}} \cdot (K-1) + CP0\_cont^k \quad (17b)$$

$$CP3\_cont^k = \frac{(D_{OUT}^{MAX} - CP0\_cont^k)}{D_{IN}^{MAX}} \cdot K + CP0\_cont^k \quad (17c)$$

$$CP4\_cont^k = \frac{(D_{OUT}^{MAX} - CP0\_cont^k)}{D_{IN}^{MAX}} \cdot \frac{(D_{IN}^{MAX} + K - 1)}{2} + CP0\_cont^k \quad (17d)$$

Figure 18:
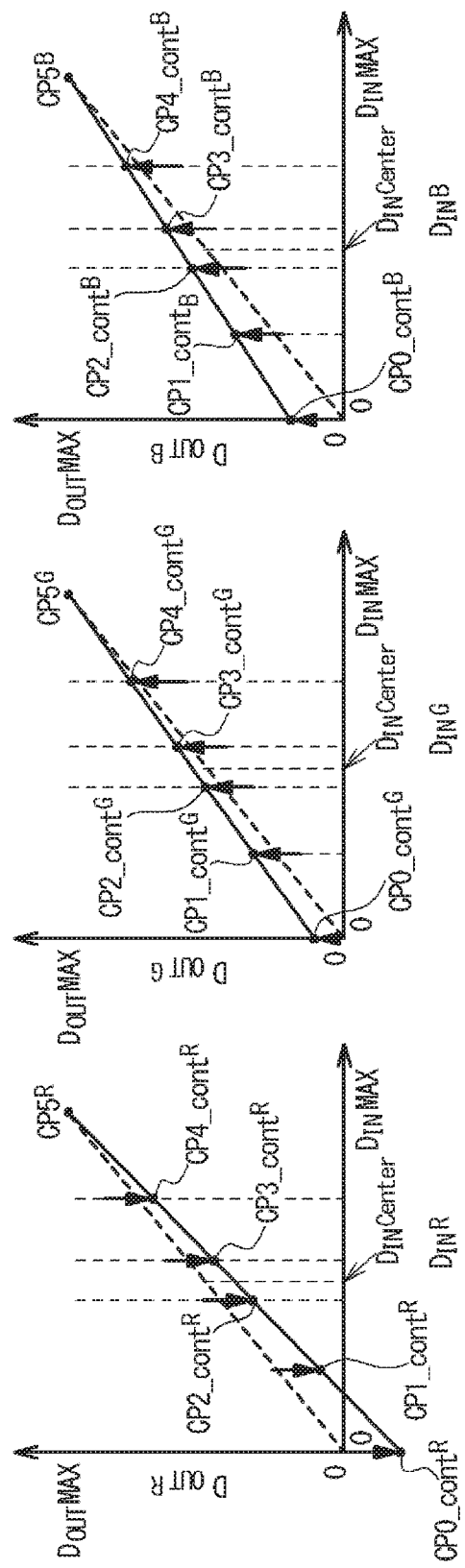
FIG. 18 illustrates correction point control data $CP1\_cont^k$ to $CP4\_cont^k$.

FIG. 18 schematically illustrates the correction point control data CP1_cont$^k$ to CP4_cont$^k$ thus calculated. In FIG. 18, symbols "CP5$^R$", "CP5$^G$" and "CP5$^B$" indicate the end points of the input-output curves used for the correction calculations of the R data D$_{IN}^R$, G data D$_{IN}^G$, and B data D$_{IN}^B$, respectively. The correction point data set CP_sel$^k$ is calculated by adding the values of the above-described correction point control data CP1_cont$^k$ to CP4_cont$^k$ to the values of the correction point data CP1 to CP4 of the correction point data sets CP_CR$^k$.

As a whole, the correction point data CP0 to CP4 of the correction point data set CP_sel$^k$ may be calculated in one embodiment by the following expressions:

$$CP0\_sel^R = CP0\_L^R + CP0\_cont^R, \quad (18a)$$

$$CP0\_sel^G = CP0\_L^G + CP0\_cont^G, \quad (18b)$$

$$CP0\_sel^B = CP0\_L^B + CP0\_cont^B, \quad (18c)$$

$$CP1\_sel^R = CP1\_L^R - (D_{IN}^{MAX} - \sigma^2) \cdot \xi^R + CP1\_cont^R, \quad (19a)$$

$$CP1\_sel^G = CP1\_L^G - (D_{IN}^{MAX} - \sigma^2) \cdot \xi^G + CP1\_cont^G, \quad (19b)$$

$$CP1\_sel^B = CP1\_L^B - (D_{IN}^{MAX} - \sigma^2) \cdot \xi^B + CP1\_cont^B, \quad (19c)$$

$$CP2\_sel^R = CP2\_L^R + CP2\_cont^R, \quad (20a)$$

$$CP2\_sel^G = CP2\_L^G + CP2\_cont^G, \quad (20b)$$

$$CP2\_sel^B = CP2\_L^B + CP2\_cont^B, \quad (20c)$$

$$CP3\_sel^R = CP3\_L^R + CP3\_cont^R, \quad (21a)$$

$$CP3\_sel^G = CP3\_L^G + CP3\_cont^G, \quad (21b)$$

$$CP3\_sel^B = CP3\_L^B + CP3\_cont^B, \quad (21c)$$

$$CP4\_sel^R = CP4\_L^R + (D_{IN}^{MAX} - \sigma^2) \cdot \xi^R + CP4\_cont^R, \quad (22a)$$

$$CP4\_sel^G = CP4\_L^G + (D_{IN}^{MAX} - \sigma^2) \cdot \xi^G + CP4\_cont^G, \text{ and} \quad (22b)$$

$$CP4\_sel^B = CP4\_L^B + (D_{IN}^{MAX} - \sigma^2) \cdot \xi^B + CP4\_cont^B, \quad (22c)$$

where $\sigma^2$ is the variance of the luminance values indicated by the variance data D$_{CHR\_o2}$, and D$_{IN}^{MAX}$ is the allowed maximum value of the R data D$_{IN}^R$, G data D$_{IN}^G$, and B data D$_{IN}^B$ of the input image data D$_{IN}$. $\xi^R$, $\xi^G$, and $\xi^B$ are predetermined proportionality constants. $\xi^R$, $\xi^G$, and $\xi^B$ may be equal to each other or different. CP$\alpha$_sel$^k$ is the value of the correction point data CP$\alpha$ of the correction point data set CP_sel$^k$ and CP$\alpha$_L$^k$ is the value of the correction point data CP$\alpha$ of the correction point data set CP_L$^k$.

The correction point data CP5 of the correction point data set CP_sel$^k$ is determined as equal to the correction point data CP5 of the correction point data set CP_L$^k$.

Since the correction point data CP5 are unchanged in the selection of the correction point data set CP_L$^k$ or calculation of the correction point data set CP_L$^k$ through an interpolation at step S23, the following expression (23) holds:

$$CP5\_sel^R = CP5\_sel^G = CP5\_sel^B = CP5 (= D_{OUT}^{MAX}). \quad (23)$$

It should be noted that, since the starting point control data sets CP0_cont$^R$, CP0_cont$^G$, and CP0_cont$^B$ are calculated for each pixel 9, the correction point data sets CP_sel$^R$, CP_sel$^G$, and CP_sel$^B$ are also calculated for each pixel 9. In other words, correction point data CP_sel$^k$ associated with a certain pixel 9 in a certain frame image are calculated from the correction point data set CP_L$^k$ calculated for the frame image, the variance $\sigma^2$ of the luminance values described in the variance data $D_{CHR\_\sigma 2}$ calculated for the frame image, and the starting point control data CP0_cont$^R$, CP0_cont$^G$ and CP0_cont$^B$ calculated for the pixel 9.

When a common gamma value $\gamma\_PIXEL$ is calculated for the R data $D_{IN}^R$, G data $D_{IN}^G$ and B data $D_{IN}^B$ of input image data $D_{IN}$ and a common correction point data set CP_L is selected or calculated, the modification of the correction point data set CP_L on the basis of the variance data $D_{CHR\_\sigma 2}$ is commonly performed for the R data $D_{IN}^R$, G data $D_{IN}^G$ and B data $D_{IN}^B$, while the modification of the correction point data set CP_L on the basis of the starting point data CP0_contR, CP0_contG, and CP0_contB are individually performed for the R data $D_{IN}^R$, G data $D_{IN}^G$ and B data $D_{IN}^B$. In this case, the correction point data CP0 to CP4 of the correction point data sets CP_sel$^R$, CP_sel$^G$ and CP_sel$^B$ are resultantly calculated in accordance with the following expressions:

$$CP0\_sel^R = CP0\_L + CP0\_cont^R, \quad (24a)$$

$$CP0\_sel^G = CP0\_L + CP0\_cont^G, \quad (24b)$$

$$CP0\_sel^B = CP0\_L + CP0\_cont^B, \quad (24c)$$

$$CP1\_sel^R = CP1\_L - (D_{IN}^{MAX} - \sigma^2) \cdot \xi + CP1\_cont^R, \quad (25a)$$

$$CP1\_sel^G = CP1\_L - (D_{IN}^{MAX} - \sigma^2) \cdot \xi + CP1\_cont^G, \quad (25b)$$

$$CP1\_sel^B = CP1\_L - (D_{IN}^{MAX} - \sigma^2) \cdot \xi + CP1\_cont^B, \quad (25c)$$

$$CP2\_sel^R = CP2\_L + CP2\_cont^R, \quad (26a)$$

$$CP2\_sel^G = CP2\_L + CP2\_cont^G, \quad (26b)$$

$$CP2\_sel^B = CP2\_L + CP2\_cont^B, \quad (26c)$$

$$CP3\_sel^R = CP3\_L + CP3\_cont^R, \quad (27a)$$

$$CP3\_sel^G = CP3\_L + CP3\_cont^G, \quad (27b)$$

$$CP3\_sel^B = CP3\_L + CP3\_cont^B, \quad (27c)$$

$$CP4\_sel^R = CP4\_L + (D_{IN}^{MAX} - \sigma^2) \cdot \xi + CP4\_cont^R, \quad (28a)$$

$$CP4\_sel^G = CP4\_L + (D_{IN}^{MAX} - \sigma^2) \cdot \xi + CP4\_cont^G, \text{ and} \quad (28b)$$

$$CP4\_sel^B = CP4\_L + (D_{IN}^{MAX} - \sigma^2) \cdot \xi + CP4\_cont^B. \quad (28c)$$

Also in this case, the correction point data CP5 of the correction point data set CP_sel$^k$ are equal to the correction point data CP5 of the correction point data set CP_L$^k$, and expression (23) holds.

At step S26, correction calculations are performed on the R data $D_{IN}^R$, G data $D_{IN}^G$ and B data $D_{IN}^B$ of the input image data $D_{IN}$ associated with each pixel 9 on the basis of the thus-calculated correction point data sets CP_sel$^R$, CP_sel$^G$ and CP_sel$^B$ associated with each pixel 9, respectively, to thereby generate the R data $D_{OUT}^R$, G data $D_{OUT}^G$ and B data $D_{OUT}^B$ of the output image data $D_{OUT}$ associated with each pixel 9. The correction calculations are achieved by the approximate gamma correction units 34R, 34G and 34B of the approximate gamma correction circuit 31, respectively.

More specifically, in the correction calculations in the approximate gamma correction circuit 31, the R data $D_{OUT}^R$, G data $D_{OUT}^G$ and B data $D_{OUT}^B$ of the output image data $D_{OUT}$ are calculated from the R data $D_{IN}^R$, G data $D_{IN}^G$ and B data $D_{IN}^B$ of the input image data $D_{IN}$ in accordance with the following expressions:

(1) For the case when $D_{IN}^k < D_{IN}^{Center}$ and $CP1 > CP0$ $$D_{OUT}^k = \frac{2(CP1 - CP0) \cdot PD_{INS}}{K^2} + \frac{(CP3 - CP0)D_{INS}}{K} + CP0 \quad (29a)$$

(2) For the case when $D_{IN}^k < D_{IN}^{Center}$ and $CP1 \leq CP0$ $$D_{OUT}^k = \frac{2(CP1 - CP0) \cdot ND_{INS}}{K^2} + \frac{(CP3 - CP0)D_{INS}}{K} + CP0 \quad (29b)$$

and (3) For the case when $D_{IN}^k > D_{IN}^{Center}$ $$D_{OUT}^k = \frac{2(CP4 - CP2) \cdot ND_{INS}}{K^2} + \frac{(CP5 - CP2)D_{INS}}{K} + CP2 \quad (29c)$$

It should be noted that CP0 to CP5 recited in expressions (29a) to (29c) indicate the correction point data CP0 to CP5 of the correction point data set CP_sel$^k$.

In the above, the center data value $D_{IN}^{Center}$ is a value defined by the following expression:

$$D_{IN}^{Center} = D_{IN}^{MAX}/2, \quad (29d)$$

where $D_{IN}^{MAX}$ is the allowed maximum value and K is the parameter given by the above-described expression (13a). Furthermore, $D_{INS}$, $PD_{INS}$, and $ND_{INS}$ recited in expressions (29a) to (29c) are values defined as follows:

(a) $D_{INS}$ $D_{INS}$ is a value which depends on the input image data $D_{IN}^k$; $D_{INS}$ is given by the following expressions (30a) and (30b):

$$D_{INS} = D_{IN}^k \text{ (for } D_{IN}^k < D_{IN}^{Center}) \quad (30a)$$

$$D_{INS} = D_{IN}^k + 1 - K \text{ (for } D_{IN}^k > D_{IN}^{Center}) \quad (30b)$$

(b) $PD_{INS}$ $PD_{INS}$ is defined by the following expression (31a) with a parameter R defined by expression (31b):

$$PD_{INS} = (K - R) \cdot R \quad (31a)$$

$$R = K^{1/2} \cdot D_{INS}^{1/2} \quad (31b)$$

As understood from expressions (30a), (30b) and (31b), the parameter R is proportional to a square root of input image data $D_{IN}^k$ and therefore $PD_{INS}$ is a value calculated by an expression including a term proportional to a square root of $D_{IN}^k$ and a term proportional to $D_{IN}^k$ (or one power of $D_{IN}^k$).

(c) $ND_{INS}$ $ND_{INS}$ is given by the following expression (32):

$$ND_{INS} = (K - D_{INS}) \cdot D_{INS}. \quad (32)$$

As understood from expressions (30a), (30b) and (32), $ND_{INS}$ is a value calculated by an expression including a term proportional to a square of $D_{IN}^k$.

Figure 19:
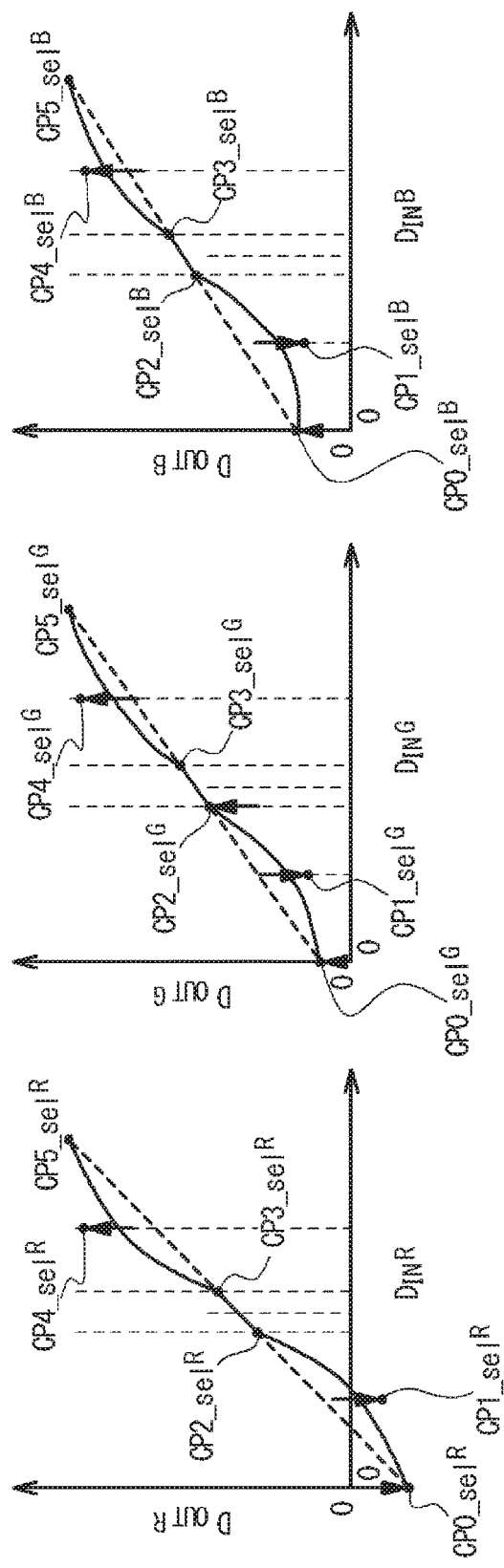
FIG. 19 is a graph illustrating the relation between R data $D_{IN}{}^R$, G data $D_{IN}{}^G$ and B data $D_{IN}{}^B$ of input image data $D_{IN}$ and R data $D_{OUT}{}^R$, G data $D_{OUT}{}^G$ and B data $D_{OUT}{}^B$ of output image data $D_{OUT}$ in the second embodiment.

FIG. 19 illustrates the relations between the R data $D_{IN}^R$, G data $D_{IN}^G$, and B data $D_{IN}^B$ of the input image data $D_{IN}$ and the R data $D_{OUT}^R$, G data $D_{OUT}^G$, and B data $D_{OUT}^B$ of the output image data $D_{OUT}$, when the R data $D_{OUT}^R$, G data $D_{OUT}^G$, and B data $D_{OUT}^B$ of the output image data $D_{OUT}$ are calculated as described above. In FIG. 19, at least one of the starting point control data CP0_cont$^R$, CP0_cont$^G$, and CP0_cont$^B$ is positive and at least another one is negative. In view of this fact, it would be easily understood from FIG. 19 that the above-described processing effectively enhances the saturation.

The output image data $D_{OUT}$, which are calculated by the approximate gamma correction circuit 31 with the above-described series of expressions, are forwarded to the color reduction circuit 23. The color reduction circuit 23 performs a color reduction on the output image data $D_{OUT}$ to generate the color-reduced image data $D_{OUT\_D}$. The color-reduced image data $D_{OUT\_D}$ are forwarded to the data line drive circuit 26 via the latch circuit 24 and the data lines 8 of the LCD panel 2 are driven in response to the color-reduced image data $D_{OUT\_D}$.

The above-described saturation enhancement processing of this embodiment effectively achieves a saturation enhancement with simple processing in which the positions of the input-output curves are adjusted. In addition, in the present embodiment, saturation enhancement and contrast enhancement are concurrently achieved in the approximate gamma correction circuit 31 and this effectively reduces the circuit size (for example, compared to the system in which contrast enhancement and saturation enhancement are performed in series as illustrated in FIG. 1B).

Although embodiments of the present invention are specifically described above, the present invention is not limited to the above-described embodiments; a person skilled in the art would appreciate that the present invention may be implemented with various modifications. Although the above-described embodiments recite the liquid crystal display device 1 including the LCD panel 2, the saturation enhancement and contrast enhancement recited in the above-descried embodiments may be implemented in an image processing apparatus in general. It should be also noted that the present invention is applicable to various panel display devices including different display panels (for example, a display device including an OLED (organic light emitting diode) display panel).

What is claimed is:

1. A display driver, comprising:
   processing circuitry configured to:
     control a starting point of an input-output curve between input color data and output color data for performing correction calculations, the starting point of the input-output curve corresponding to an allowed minimum value of the input color data; and
     enhance a saturation of received image data by performing a correction calculation for at least one color of a plurality of colors of the image data; and
   drive circuitry configured to drive a display panel in response to the enhanced-saturation image data.

2. The display driver according to claim 1, wherein the processing circuitry is further configured to, for each color of the plurality of colors of the image data, control a respective starting point of a respective input-output curve for the color.

3. The display driver according to claim 1, wherein the input-output curve is linear.

4. The display driver according to claim 1, wherein the correction calculation includes a linear function correction based on a linear input-output curve.

5. The display driver according to claim 1, wherein the correction calculation includes an approximate gamma correction based on an approximate expression of gamma correction on the image data.

6. The display driver according to claim 5, wherein the input-output curve comprises a gamma curve modified to achieve contrast enhancement.

7. The display driver according to claim 6, wherein the processing circuitry is further configured to control a shape and the starting point of the gamma curve.

8. The display driver according to claim 6, wherein the processing circuitry is further configured to control one or more points of the gamma curve between the starting point and an end point of the gamma curve.

9. The display driver according to claim 1, wherein the processing circuitry is further configured to enhance a contrast of the image data concurrently with the saturation enhancement.

10. The display driver according to claim 1, wherein the processing circuitry is further configured to enhance a contrast of the image data after the saturation enhancement.

11. The display driver according to claim 1, wherein the plurality of colors of the image data include red, green, and blue.

12. An image processing apparatus, comprising:
    starting point control circuitry configured to control a starting point of an input-output curve between input color data and output color data for performing correction calculations, the starting point of the input-output curve corresponding to an allowed minimum value of the input color data; and
    correction circuitry configured to enhance a saturation of received image data by performing a correction calculation for at least one color of a plurality of colors of the image data.

13. The image processing apparatus of claim 12, wherein the starting point control circuitry is further configured to, for each color of the plurality of colors of the image data, control a respective starting point of a respective input-output curve for the color.

14. The image processing apparatus of claim 12, wherein the correction calculation includes a linear function correction based on a linear input-output curve.

15. The image processing apparatus of claim 12, wherein the correction calculation includes an approximate gamma correction based on an approximate expression of gamma correction on the image data.

16. The image processing apparatus of claim 12, wherein the correction circuitry is further configured to enhance a contrast of the image data concurrently with the saturation enhancement.

17. The image processing apparatus of claim 12, wherein the correction circuitry is further configured to enhance a contrast of the image data after the saturation enhancement.

18. A method, comprising:
    controlling a starting point of an input-output curve between input color data and output color data for performing correction calculations, the starting point of the input-output curve corresponding to an allowed minimum value of the input color data; and
    generating, using the starting point, saturation-enhanced image data by performing a correction calculation for at least one color of a plurality of colors of received image data.

19. The method of claim 18, wherein performing the correction calculation further comprises:
    enhancing a contrast of the image data concurrently with the saturation enhancement.

20. The method of claim 18, wherein performing the correction calculation further comprises:
    enhancing a contrast of the image data after the saturation enhancement.

* * * * *